(12) United States Patent
Gottlob et al.

(10) Patent No.: US 11,281,729 B2
(45) Date of Patent: Mar. 22, 2022

(54) METHOD FOR AUTOMATICALLY GENERATING A WRAPPER FOR EXTRACTING WEB DATA, AND A COMPUTER SYSTEM

(71) Applicant: OXFORD UNIVERSITY INNOVATION LIMITED, Oxford (GB)

(72) Inventors: Georg Gottlob, Oxford (GB); Emanuel Sallinger, Oxford (GB); Ruslan Fayzrakhmanov, Oxford (GB); Tim Furche, Oxford (GB); Giovanni Grasso, Oxford (GB)

(73) Assignee: Oxford University Innovation Limited

( * ) Notice: Subject to any disclaimer, the term of this patent is extended or adjusted under 35 U.S.C. 154(b) by 173 days.

(21) Appl. No.: 16/630,485

(22) PCT Filed: Jul. 12, 2018

(86) PCT No.: PCT/GB2018/051987
§ 371 (c)(1),
(2) Date: Jan. 13, 2020

(87) PCT Pub. No.: WO2019/012287
PCT Pub. Date: Jan. 17, 2019

(65) Prior Publication Data
US 2020/0167393 A1 May 28, 2020

(30) Foreign Application Priority Data
Jul. 13, 2017 (GB) ...................... 1711315

(51) Int. Cl.
*G06F 16/951* (2019.01)
*G06F 16/958* (2019.01)
*G06F 9/54* (2006.01)

(52) U.S. Cl.
CPC ............ *G06F 16/951* (2019.01); *G06F 9/547* (2013.01); *G06F 16/958* (2019.01)

(58) Field of Classification Search
None
See application file for complete search history.

(56) References Cited

U.S. PATENT DOCUMENTS 9,223,871 B2 * 12/2015 Mallapragada Naga Surya .......... G06F 16/951
10,402,488 B2 9/2019 Chen et al.
(Continued)

OTHER PUBLICATIONS

Fayzrakhmanov et al, "Browserless Web Data Extraction: Challenges and Opportunities", WWW 2018, Apr. 23-27, 2018, Lyon, France © 2018 IW3C2 (International World Wide Web Conference Committee), published under Creative Commons CC BY 4.0 License. ACM ISBN 978-1-4503-5639-8/18/04.*
(Continued)

*Primary Examiner* — Uyen T Le
(74) *Attorney, Agent, or Firm* — Fresh IP PLC; Clifford D. Hyra; Aubrey Y. Chen

(57) ABSTRACT

Methods for automatically generating a wrapper for extracting web data and corresponding computer systems are disclosed. In one arrangement, a first wrapper is used to generate a second wrapper. The first wrapper extracts target data from one or more target web pages hosted by one or more target web servers. The second wrapper is capable of extracting the same target data from the same one or more target web pages without using a web browser engine to perform a) sending requests to the one or more target web servers, and/or b) processing replies from the one or more target web servers. The generation of the second wrapper comprises analysing one or both of the following: (i) code defining the first wrapper, (ii) interactions between the first wrapper and the one or more target web servers that occur during execution of the first wrapper.

31 Claims, 11 Drawing Sheets

(56) References Cited

U.S. PATENT DOCUMENTS

| | | | |
|---|---|---|---|
| 2005/0022115 A1* | 1/2005 | Baumgartner | G06F 16/9535 |
| | | | 715/205 |
| 2008/0155320 A1* | 6/2008 | Goetz | G06F 16/20 |
| | | | 714/15 |
| 2011/0307479 A1 | 12/2011 | Yin et al. | |
| 2015/0248453 A1* | 9/2015 | Martick | G06F 16/24 |
| | | | 702/187 |

OTHER PUBLICATIONS

I. Muslea, S. Minton, C. A. Knoblock. A Hierarchical Approach to Wrapper induction. In Agents. 190-197, 1999.
R. Baumgartner, O. Frölich, G. Gottlob. The Lixto Systems Applications in Business Intelligence and Semantic Web. ESWC 2007, 16-26, 2007.
J. Yuan Su, D. Johng Sun, I. Chen Wu, and L. Pin Chen. 2010. On design of browseroriented data extraction system and the plug-ins. Journal of Marine Science and Technology 18, 2, 189-200, 2010.
T. Furche, G. Gottlob, G. Grasso, C. Schallhart, and A. Sellers. OXPath: A language for scalable data extraction, automation, and crawling on the deep web. VLDB J., pp. 47-72, 2013.
R. Baumgartner, G. Gottlob, and S. Flesca, The Elog Web Extraction Language, Logic for Programming, Artificial Intelligence, and Reasoning vol. 2250, pp. 548-560. Springer, 2001.
R. Baumgartner, G. Gottlob, and M. Herzog. Scalable web data extraction for online market intelligence. Proceedings of the VLDB Endowment, 2(2):1512-1523, 2009.
A. Arasu and H. Garcia-Molina. Extracting structured data from web pages. In Proceedings of the 2003 ACM SIGMOD International Conference on Management of Data, SIGMOD '03, pp. 337 348, New York, NY, USA, 2003. ACM.

* cited by examiner

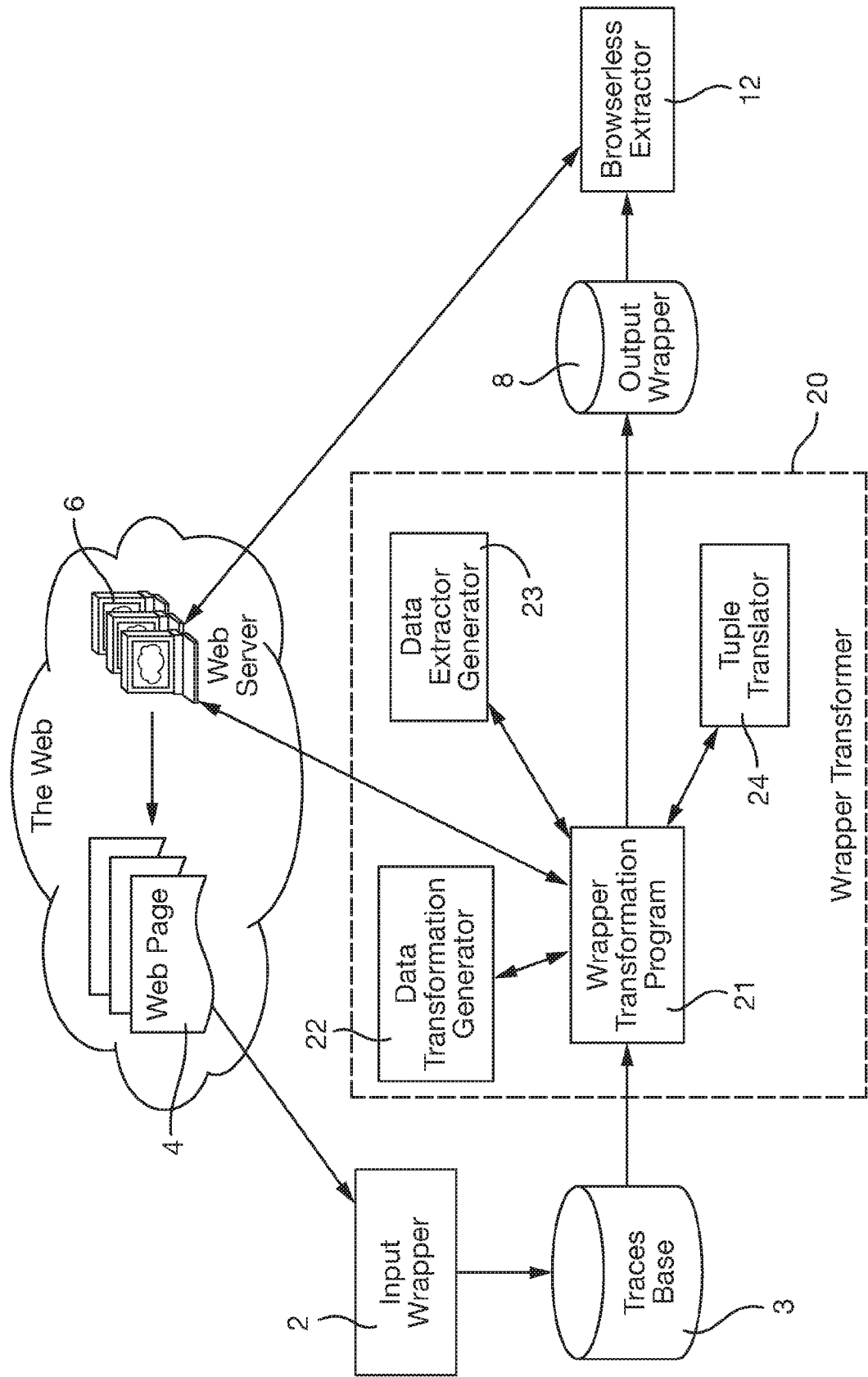

Fig. 6

| Algorithm1: Finding an HTTP wrapper model |
|---|

1 Function *findHttpWrapper* ($\mathbb{T}, I, O, Val^I, Val^O$)
2      for $(T,M) \in findFinalCallGroups(\mathbb{T}, O\ Val^O)$ do /* T is raw HTTP calls, providing the required wrapper's output, M reflects the correspondence between parameters */
3         $Q \leftarrow trace(T, \mathbb{T}, I, Val^I)$
4         if $Q \neq$ NULL then
5            $(\overset{\circ}{T}, G^H) \leftarrow Q$
6            $final^{G^H}(\overset{\circ}{T}) :=$ True
7            for $(o, \hat{r}, trans) \in M$ do /* $o \in O$, $\hat{r}$ is an ouput parameter identified in T, *trans* transforms values of $\hat{r}$ into values of $o$ */
8                *linkWithWrapperOutput*$(o, \hat{r}, trans, \overset{\circ}{T}, G^H)$
9            return $G^H$
10     return NULL
11 Function *trace* $(T, \mathbb{T}, I, O, Val^I,)$ /* set of similar transactions, set of sequences of unseen transactions */
12     $(\overset{\circ}{T}{}^{G^H}, F^{G^H}) \leftarrow initEmptyModel()$
13     $\overset{\circ}{T} \leftarrow abstract(T, G^H);$
14     for $\rho \in in(\overset{\circ}{T})$ do
15        *linked* $\leftarrow$ False
16        $K \leftarrow findMatchWithWrapperInput(T, I, Val^I)$
17        if $K \neq$ NULL then
18           $(I, trans) \leftarrow K;$ *linked* $\leftarrow$ True
19           *linkWithWrapperIntput*$(\rho, I, trans, \overset{\circ}{T}, G^H)$
20        else
21           for $(T', \hat{r}', trans') \in findOutputMatchCalls(\mathbb{T} \setminus T, getVals(\rho, T))$ do
22               $L \leftarrow trace(T', \mathbb{T} \setminus T, I, Val^I)$
23               if $L \neq$ NULL then
24                  $(\overset{\circ}{T}', (T', F')) \leftarrow L;$ *linked* $\leftarrow$ True
25                  *linkCalls*$(\rho, \hat{r}', trans', \overset{\circ}{T}, \overset{\circ}{T}', T', F', G^H)$
26                  break
27     if *linked* = False then return NULL
28     if $isInitialCall(\overset{\circ}{T}, I)$ then $init^{G^H}(\overset{\circ}{T}) :=$ True
29     return $(\overset{\circ}{T}, (\overset{\circ}{T}{}^{G^H}, F^{G^H}))$

| Wrapper | OXPath wrapper | | | HTTP wrapper | | | Comparison | | | Analysis |
|---|---|---|---|---|---|---|---|---|---|---|
| | Time(ms) | Data(B) | Calls | Time(ms) | Data(B) | Calls | Time(%) | Data(%) | Calls(%) | time(ms) |
| audi | 23,614 | 1,948,095 | 42 | 210 | 31,711 | 1 | 0.89 | 1.63 | 2.38 | 117 |
| dacia | 14,805 | 3,663,442 | 49 | 730 | 144,203 | 1 | 4.93 | 3.94 | 2.06 | 1,931 |
| fiat | 31,372 | 6,037,517 | 154 | 660 | 60,225 | 1 | 2.10 | 1.00 | 0.65 | 119 |
| infiniti | 41,471 | 4,474,614 | 89 | 300 | 74,231 | 1 | 0.72 | 1.66 | 1.13 | 2,432 |
| landrover | 26,871 | 3,902,740 | 61 | 825 | 59,048 | 1 | 3.07 | 1.51 | 1.63 | 1,756 |
| lexus | 21,980 | 3,696,690 | 77 | 135 | 86,547 | 1 | 0.61 | 2.34 | 1.30 | 11 |
| mazda | 19,649 | 2,455,324 | 164 | 385 | 5,904 | 1 | 1.96 | 0.24 | 0.61 | 111 |
| mercedes | 37,283 | 2,650,609 | 74 | 210 | 97,459 | 1 | 0.56 | 3.68 | 1.36 | 3,438 |
| renault | 41,717 | 8,076,588 | 97 | 18,505 | 1,208,258 | 1 | 44.36 | 14.96 | 1.03 | 1,498 |
| vauxhall | 60,496 | 3,431,231 | 89 | 5,120 | 8,529 | 5 | 8.46 | 0.25 | 5.59 | 15,777 |
| Average: | 31,926 | 4,033,685 | 90 | 2,708 | 177,611 | 1.4 | 6.77 | 3.12 | 1.77 | 2,719 |

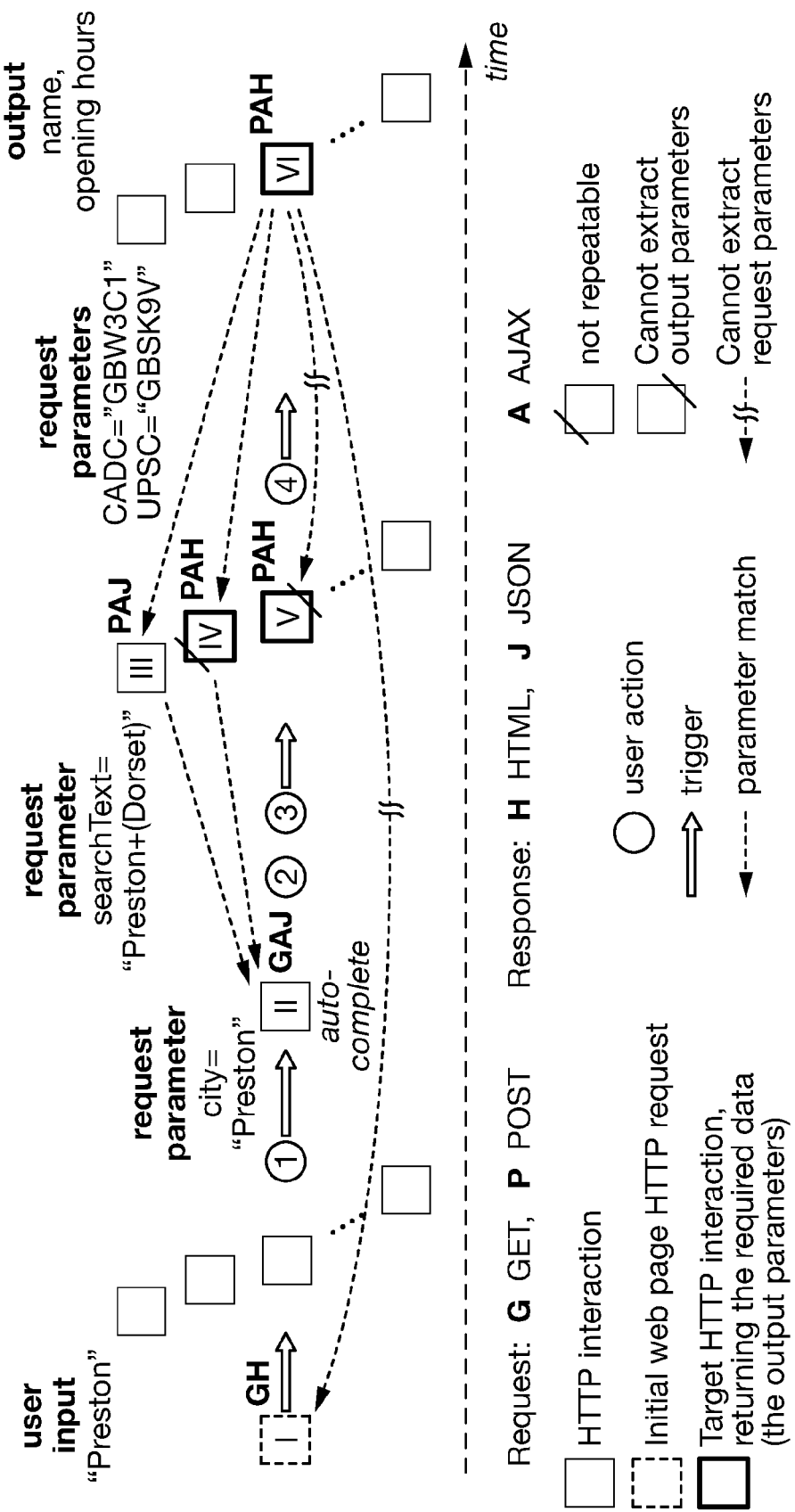

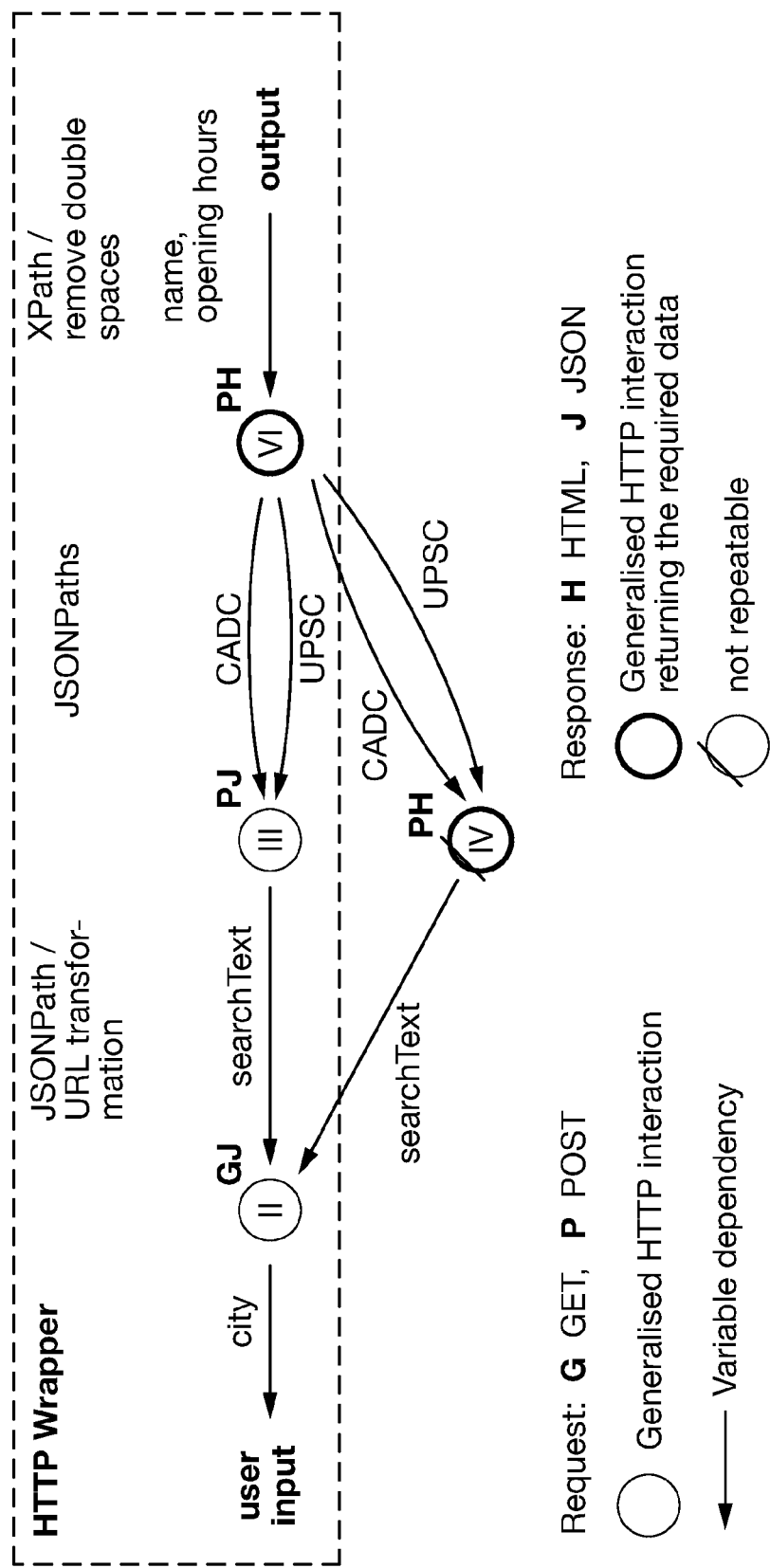

Fig. 12

Algorithm 2: The FASTWRAP Algorithm

```
1  Function FINDWRAPPERS(T, V, init)
      Input: A set of HTTP traces T, a parameter V which maps traces to
              sets of target records, and a boolean flag init specifying whether
              it is the initial run of the algorithm.
      Output: A set of HTTP wrappers which extract the target parameters.
2     if init = true then  // identify target abstract interactions
3     |   return RESOLVEDEPENDENCIES(T, V, true)
4     else  // identify other abstract interactions
5     |   D ← {}
6     |   for v ∈ V do  // each v ∈ V associated with a variable parameter
      |                   is traced separately
7     |   |   D' ← RESOLVEDEPENDENCIES(T, {v}, false)
8     |   |   if |D'| ≠ 0 then D ← D ∪ D'
9     |   return D 10 Function RESOLVEDEPENDENCIES(T, V, init)
      Input: A set of HTTP traces T, a parameter V which maps traces to
              sets of target records, and a boolean flag init specifying whether
              it is the initial run of the algorithm.
11    Find interactions T ∈ T with values(V) in their response        [3.2]
12    Group interactions T into a set of equivalence classes C         [3]
13    D ← {}  // set of intermediate or final HTTP wrappers
14    for c ∈ C do                                                      [4]
15    |   Generate a data selector(s) S                                 [4.1]
16    |   Generate a value transformation function(s) F                 [4.2]
17    |   if S and F are successfully generated then                    [4.3]
18    |   |   if interactions in c can be repeated and data of V can be [4.4]
      |   |     extracted with S and F then
19    |   |   |   Identify constant and variable parameters V' in c     [4.5]
20    |   |   |   Remove superfluous parameters from V' of c
21    |   |   |   Create an abstract HTTP interaction A' for c
22    |   |   |   Label A' with S, F, and name-origin, accordingly /* add
      |   |   |     parameter tracing information                    */
23    |   |   |   for v' ∈ V' do                                        [4.6]
24    |   |   |   |   if v' is a user input parameter with a value
      |   |   |   |     transformer F' then
25    |   |   |   |   |   Label v' with the name of the corresponding
      |   |   |   |   |     input parameter and F'
26    |   |   |   V" ← V' \ set of labelled parameters                  [4.7]
27    |   |   |   D' ← FINDWRAPPERS(T \ c, V", false)
28    |   |   |   if |V"| ≠ |D'| then continue /* not all parameters can
      |   |   |     be traced for A'                                  */
29    |   |   |   Initialise a dependency graph d with A' labelled as a
      |   |   |     "target interaction"
30    |   |   |   for d' ∈ D' do                                        [4.8]
31    |   |   |   |   Add d' into d
32    |   |   |   |   Add a dependency arc between a local target node
      |   |   |   |     A" of d' and A' and label it with parameter
      |   |   |   |     tracing information
33    |   |   |   |   if init = false then Remove parameter tracing
      |   |   |   |     information from A", remove label "target
      |   |   |   |     interaction"
34    |   |   |   D ← D ∪ {d}
35    |   |   |   if init = false then break /* ensure that each parameter
      |   |   |     has a single dependency arc                       */
36    return D
```

Fig. 14

| Wrappers | OXPath wrappers | | | | HTTP wrappers | | | | Comparison | | |
|---|---|---|---|---|---|---|---|---|---|---|---|
| | Time†(ms) | Data‡(KB) | Interactions | | Time(ms) | Data(KB) | Interactions | | Time(%) | Data(%) | Interactions(%) |
| A-RCM | 33 780 | 4151 | 90.0 | | 1145 | 134 | 1.5 | | 3.4 | 3.2 | 1.7 |
| A-RND | 22 299 | 2839 | 79.7 | | 1314 | 76 | 1.0 | | 5.9 | 2.7 | 1.3 |
| B-type | 23 879 | 1523 | 38.6 | | 837 | 69 | 1.0 | | 3.5 | 4.6 | 2.6 |
| All | 26 917 | 3013 | 76.9 | | 1139 | 96 | 1.1 | | 4.2 | 3.2 | 1.4 |

† without browser initialization
‡ without loading images

Fig. 15

| Wrappers | Generation◊ (s) | Content formats (%) | Value transformers♦ (%) | Ignored variable parameters (%) | Stably correct models (%) | Successful evaluations (%) |
|---|---|---|---|---|---|---|
| A-RCM | 137.9 | JSON: 52; HTML:45; XML: 3 | n: 77; u: 14; p: 6; s:3 | 16.7 | 100.0 | 100.0 |
| A-RND | 33.1 | HTML: 91; JSON: 9 | n: 52; u: 33; s: 10; c: 5 | 8.7 | 90.9 | 97.0 |
| B-type | 2.1 | HTML: 92; JSON: 5; XML: 3 | — | 0.0 | 100.0 | 100.0 |
| All | 44.9 | HTML: 76; JSON: 22; XML:2 | n:68; u: 21; s: 5; p: 4; c:2 | 13.8 | 94.9 | 98.2 |

◊ HTTP wrapper generation from HTTP traces
♦ n – no transformation, u – URL en-(de)code, p – precision, s – substring, c – composite

METHOD FOR AUTOMATICALLY GENERATING A WRAPPER FOR EXTRACTING WEB DATA, AND A COMPUTER SYSTEM

The present invention relates to automated extraction of web data from web pages, and in particular to automated generation of a wrapper that can perform the extraction more efficiently by direct interaction with relevant web servers.

Web data relevant to most applications is distributed over heterogeneously structured websites, usually does not come with a schema, and cannot be directly queried, except by manual keyword search. Given that many companies and institutions need to access outside data for better decision making, they have to rely on automated Web data extraction programs, also known as wrappers. They use wrapper generators that produce wrappers. These wrappers continuously or periodically extract information from relevant websites and store this information in a highly structured format in a data store. In fact, Web data extraction is nowadays heavily and proficuously used by various branches of industry. Electronics retailers, for example, are interested in the daily prices offered by their competitors, as are hotels and supermarket chains. International construction firms automatically extract tenders from hundreds of websites. Other sectors have adopted Web data extraction as part of their core business. Among those are flight search engines and media intelligence companies.

Since around the year 2000, sophisticated semi-automated visual and interactive tools have been developed, which allow users to define wrappers via visual point-and-click actions. Examples are tools such as STALKER (I. Muslea, S. Minton, C. A. Knoblock. A Hierarchical Approach to Wrapper Induction. In Agents. 190-197, 1999) and Lixto (R. Baumgartner, O. Frölich, G. Gottlob. The Lixto Systems Applications in Business Intelligence and Semantic Web. ESWC 2007, 16-26, 2007). Other advanced semi-automatic tools are, for example, import.io, Mozenda (http://www.mozenda.com), FMiner (http://www.fminer.com), iMacros (http://imacros.net), Visual Web Ripper (http://visualwebripper.com), and the BODE system (J. Yuan Su, D. Johng Sun, I. Chen Wu, and L. Pin Chen. 2010. On design of browser-oriented data extraction system and the plug-ins. Journal of Marine Science and Technology 18, 2, 189-200, 2010). OXPath (T. Furche, G. Gottlob, G. Grasso, C. Schallhart, and A. Sellers. OXPath: A language for scalable data extraction, automation, and crawling on the deep web. VLDB J., pages 47-72, 2013) is another example of a language and a wrapper which runs on a rendered web page and can be automatically generated with a DIADEM system. The OXPath data extraction language enriches XPath with simulated user interaction, and node and form field selection based on visual features.

Advantages of Visual-Clue Based Data Extraction. Most modern data extraction tools, including those mentioned, use visual clues and visual interaction in the wrapper generation process and rely on graphical and geometric concepts such as the distance between two rendered elements. The use of visual clues and "page geography" often leads to more precise and more robust wrappers. The possibility of defining, modifying, and testing wrappers in a visual fashion has relieved wrapper designers from the tedious task of having to decipher the HTML code of each target web page, and of writing sequential programs that act on it. The semi-automatic wrapper generation process for complex websites, inclusive of testing, now typically takes a couple of hours at most, rather than a couple of days using traditional methods.

Drawbacks of Visual-Clue Based Data Extraction. While infinitely beneficial for wrapper design, visual-clue based wrappers come with an awful drawback at execution time: The natural approach, which is currently in use, is to render the page internally via an embedded browser. This rendering tasks consists of (a) parsing the web page and building a DOM tree (b) applying the CSS rules and (c) executing JavaScript, which is typically the most computationally expensive part, often having wide-ranging effects on the page's DOM.

A coarse analysis of the relative computational cost for visual wrappers in OXPath shows that the browser initialization phase takes about 13% of the runtime, the rendering phase about 85%, and the actual extraction about 2%. Initialization and rendering jointly require approximately 50 times more time than the actual data extraction. For visual-clue based wrappers written in other programming languages than OXPath, this disproportion is similar or even worse. Companies engaged in massive data extraction suffer sorely under this huge runtime overhead. For example, financial companies, flight search companies or news services have hundreds of wrappers working continually, both in their own data centers and on rented cloud resources. A factor of 50 runtime overhead leads to huge additional costs. Moreover, the implied slow-down of real-time extraction tasks, such as extracting the current price of a flight, often leads to user dissatisfaction. For these and other critical real-time scraping tasks, such as data access in automated option trading, visual wrappers are simply too slow.

To mitigate such runtime problems, many companies resort to replacing their most heavily used wrappers by alternative wrappers, which can directly interact with web servers. One important type of such wrappers is so-called HTTP wrappers. An HTTP wrapper is a browserless wrapper that interacts directly with a remote web server by sending HTTP requests (similar to those a browser would issue) and by analyzing the received replies without rendering them, picking the desired data directly from the raw content. Thus, HTTP wrappers are considerably faster than the original visual wrappers. They usually make only those server requests that are really necessary for obtaining the desired data, and skip a large number of requests that a browser would usually make to load irrelevant images, fonts, CSS style sheets, JavaScript code, text, and ads.

In order to build HTTP wrappers, highly-qualified specialists initially perform the typical user interaction through a browser and analyze the HTTP traffic between the browser and the server. Once they have understood the browser-server interaction, which usually consists of a series of back-and-forth data exchange steps, and after they have identified the precise flow of the relevant data items, they write a parametrized HTTP wrapper that simulates the browser-server interaction obtaining, for each set of input parameters, the desired output data from the remote server without any rendering. Note that writing HTTP wrappers by hand is an extremely complicated task. Even specialists typically require several days to develop and test a new HTTP wrapper. Moreover, HTTP wrappers are usually less robust than visual-clue based wrappers and require more maintenance in case of structural website changes.

It is frustrating that for many scraping applications one has to go back to old-fashioned manual programming, and the data extraction community is in sore need of new methods which avoid the drawbacks of the above two types of wrappers altogether. The dichotomy of wrapper types and the implied necessity of choosing between one or another set of drawbacks is a major pain point. It is important to have a method which combines all the advantages of both visual wrapping and HTTP wrapping, without sharing the disadvantages of either method. It is an object of the invention to provide methods that facilitate web data extraction.

According to an aspect of the invention, there is provided a method for automatically generating a wrapper for extracting web data, comprising: using a first wrapper to generate a second wrapper, wherein: the first wrapper is configured to extract target data from one or more target web pages hosted by one or more target web servers; the second wrapper is capable of extracting the same target data from the same one or more target web pages without using a web browser engine to perform a) sending requests to the one or more target web servers, and/or b) processing replies from the one or more target web servers; and the generation of the second wrapper comprises analysing one or both of the following: (i) code defining the first wrapper, (ii) interactions between the first wrapper and the one or more target web servers that occur during execution of the first wrapper.

Thus, a method is provided which can involve transforming first wrappers automatically into second wrappers. The first wrappers are used at wrapper design time and the second wrappers are used at runtime. This concept is simple to formulate, but represented a great technical challenge. It is desirable for the automated transformation to be "intelligent" and produce second wrappers (e.g. HTTP wrappers) which perform only the necessary steps and suppress useless requests that load pictures, ads, and other irrelevant data. This approach would then combine the advantages of relatively simple generation of first wrappers with the fast execution time, real-time wrapping suitability, low cost, and reduced Internet traffic of second wrappers. Wrapper maintenance, too, is simpler than with hand-made second wrappers. The inventors have observed that the approach achieves a level of wrapper robustness that is not worse than the robustness level of visual wrappers. Advantages of visual-clue wrapping and HTTP wrapping can therefore be combined.

The method effectively transforms a first wrapper (e.g. an interactive wrapper), which as explained below can be done regardless of its language and implementation, into a significantly more efficient version (a second wrapper) that requires minimal or no use of a web browser engine, for example for web rendering, operating for example on the HTTP level. As will be shown below, embodiments of the disclosure have been demonstrated to address challenges observed in the meta-search domain of car dealerships. The approach is shown in many cases to eliminate the need of web browser and the problems related to the interaction with complex changing interfaces of web applications. According to embodiments, the method automatically discovers a web application's back end API. The generated second wrappers can therefore directly access the data required in a much more efficient way than is done using interactive wrappers. Second wrappers generated using embodiments of the disclosure may thus be API-aware wrappers, and can vastly outperform traditional approaches, with reductions in time, data transfer and number of HTTP requests. The generated second wrapper can be on average 23.8 times faster that the original first wrapper. It usually makes only those server requests that are really necessary for obtaining the target data, and suppress a large number of requests that a browser would usually make to load irrelevant images, fonts, CSS style sheets, JavaScript code, text, and ads. Furthermore, we have observed that around 97% of the Internet traffic (without images) generated by the original first wrappers is totally useless for obtaining the desired data and is suppressed in a corresponding second wrapper. The method generates the second wrappers automatically, making them no more difficult to create than the original browser-based first wrappers.

In embodiments, the analysis of interactions comprises construction and use of a dependency graph comprising nodes and arcs, each node representing an interaction and each arc representing propagation of parameters from one interaction to another. This approach to analysis has been found to provide the basis for particularly efficient generation of the second wrapper.

According to an alternative aspect, there is provided a computer system configured to automatically generate a wrapper for extracting web data, the computer system being configured to perform the following steps: use a first wrapper to generate a second wrapper, wherein: the first wrapper is configured to extract target data from one or more target web pages hosted by one or more target web servers; the second wrapper is capable of extracting the same target data from the same one or more target web pages without using a web browser engine to perform a) sending requests to the one or more target web servers, and/or b) processing replies from the one or more target web servers; and the generation of the second wrapper comprises analysing one or both of the following: (i) code defining the first wrapper, (ii) interactions between the first wrapper and the one or more target web servers that occur during execution of the first wrapper.

While HTTP wrappers constitute currently the most relevant type of second wrappers, and while some embodiments described below use HTTP wrappers, embodiments of the present disclosure are not limited to specific aspects of the HTTP protocol. Embodiments may be provided which use other message-based protocols and request-response message-passing systems, such as RPC (remote procedure call), LDAP, or other local and remote-based communication protocols.

The invention will now be further described, by way of example, with reference to the accompanying drawings, in which:

FIG. 2 depicts an example architecture within which methods of the disclosure can be executed.

Figure 5:
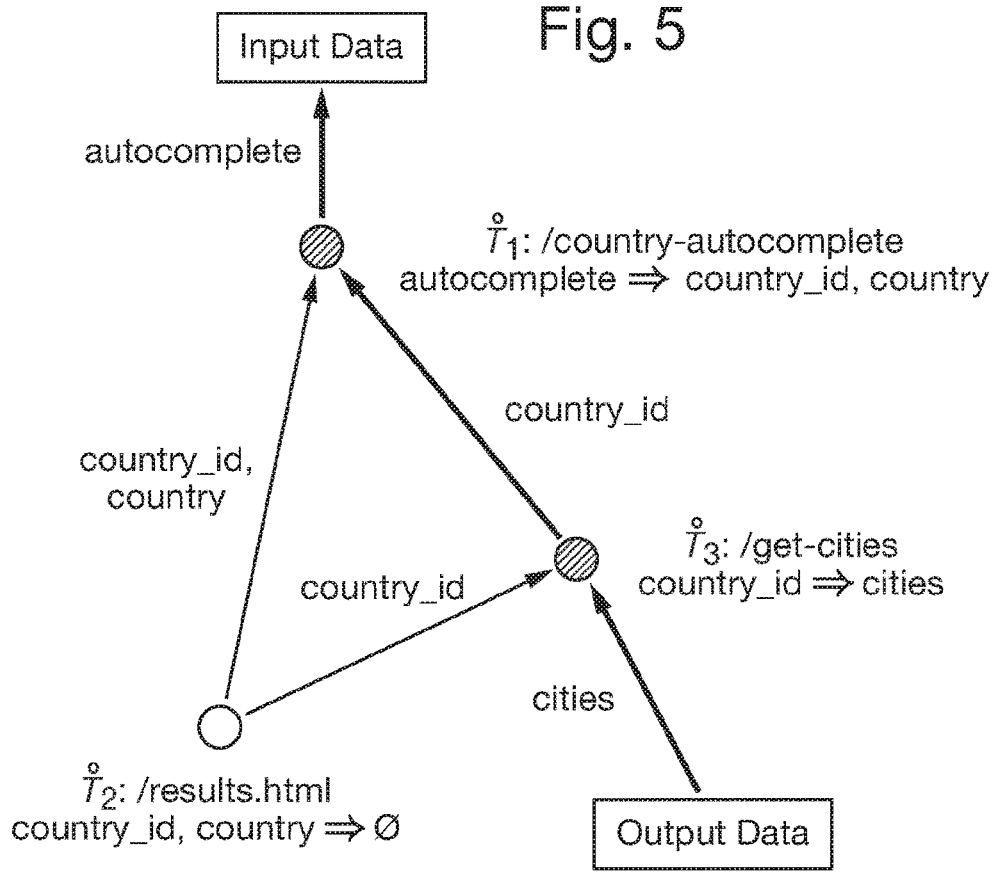

FIG. 5 depicts an example dependency graph for a country search example. Interactions with no incoming or outgoing edges are omitted; in this case, the jQuery library and the initial index page. The bolded edges and nodes represent an example wrapper model, according to Def. 8 (given below).

FIG. 6 depicts an example algorithm, Algorithm 1, for finding an HTTP wrapper model.

Figures 7, 8:
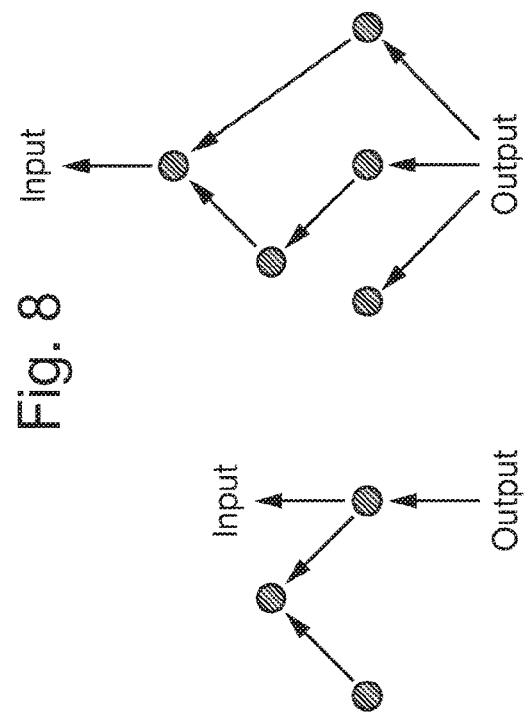

FIG. 7 depicts results of evaluating Algorithm 1.

FIG. 8 depicts generic examples of dependency graph structures generated by Algorithm 1.

Figure 9:
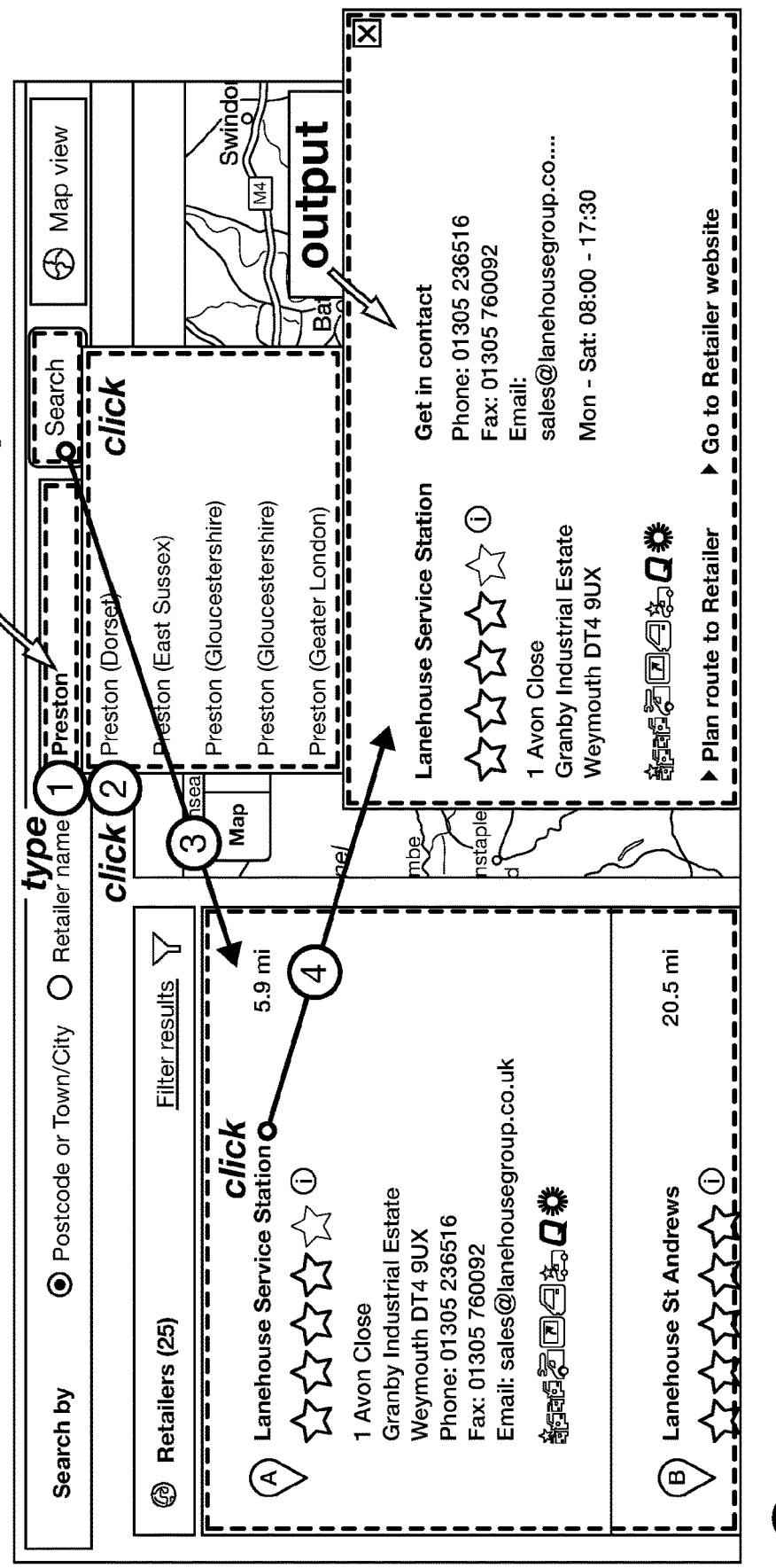

FIG. 9 depicts the four-step interaction for extraction from Vauxhall with the use input "Preston".

FIG. 10 depicts a schematic representation of an HTTP trace for the Vauxhall example (FIG. 9) with the user input, "Preston". HTTP interactions are ordered chronologically. It also illustrates parameter matches and the relations between user actions and triggered HTTP interactions, FIG. 11 depicts the overall dependency graph of generalised HTTP interactions for the Vauxhall example (with disconnected nodes omitted) and corresponding HTTP wrapper.

FIG. 12 depicts an example FastWrap algorithm, Algorithm 2, for finding an HTTP wrapper model.

Figure 13:
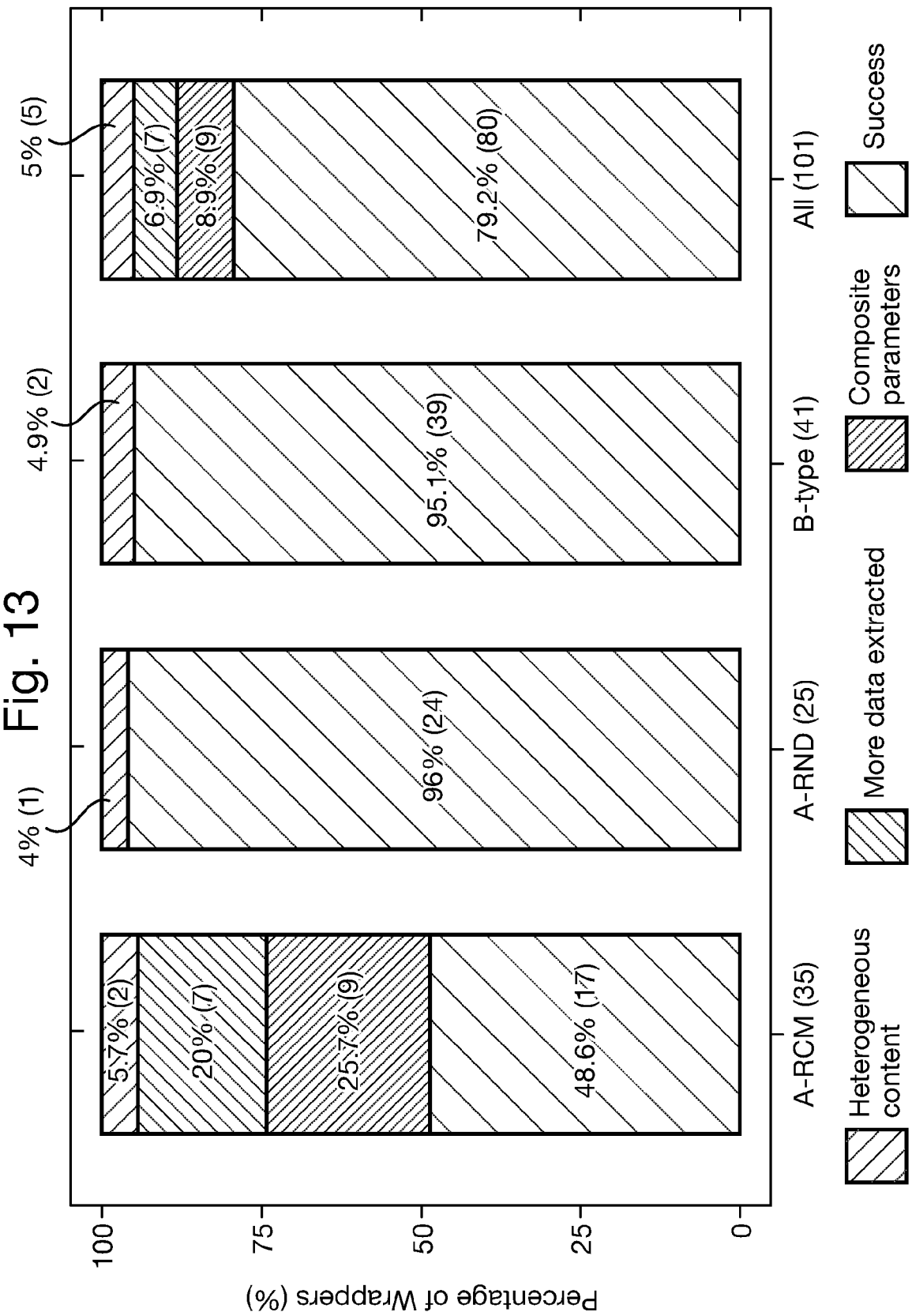

FIG. 13 depicts overall results for evaluating 101 wrappers for various verticals, including a car dealership domain and restaurant chains. The figure presents a success rate of the FastWrap algorithm (see FIG. 12) for different datasets and limitations discovered, e.g., those related to heterogeneous content of the response's content, extraction of a superset of data, and composite parameters.

FIG. 14 is a table providing a comparison of wrapper execution time for generated second wrappers, data received from the server and the number of HTTP calls made by the original OXPath wrappers running in Firefox (with images disabled) and a wrapper generated according to an embodiment of the present disclosure running in a Python-based tool.

FIG. 15 is a table presenting characteristics of generated HTTP wrappers for different verticals over 101 OXPath wrappers. This includes HTTP wrapper generation runtime, distribution of different content formats, applied value transformers, number of ignored variable parameters, ratio of stably correct models and successful evaluations.

DETAILED DESCRIPTION

Problem Definition

Visual wrappers targeting complex Web applications require the simulation of specific sequences of user interactions either to get to a certain state of a current web page (e.g., to get detailed information about a product loaded by AJAX requests) or to reach a page with relevant data (e.g., sending a filled in Web form or navigating to a specific page). These interactions are enriched with input and output instructions, parametrizing such interactive wrappers, e.g., to define that a certain form field should receive a location as input and that a particular part of the search result page to be extracted is a phone number. The parametrization is necessary for an intensive large-scale data extraction.

Visual wrappers mimic user actions by firing DOM events such as click or keypress in the integrated Web page rendering engine. In FIG. 9, we see an example of a visual wrapper used for extracting details of car dealerships. This scenario is represented by a sequence of four user interactions: User action 1 entering search keywords (an input parameter), User action 2 selecting a relevant suggestion from the autocomplete list, User action 3 clicking the search button, which displays a list of corresponding car dealers, and User action 4 clicking a link to a more detailed view which shows the target output data.

We can observe two levels of interaction: the user-browser interaction and the HTTP-based browser-server communication. On the first level, the data extraction scenario is defined by a sequence of interactions with the rendered graphical interface. Simulated user actions (e.g., User action 1—User action 4 illustrated in FIG. 9) trigger the invocation of HTTP request-response exchanges (HTTP interactions) as well as the execution of the JavaScript code parsing and modifying the data obtained from the server. In our example in FIG. 9, the visual wrapper execution will produce a sequence of HTTP traces as schematically illustrated in FIG. 10 (and which will be explained below). For example, the User action 1, entering input string into the search form, generates an autocomplete list by triggering the HTTP request-response 11 (see FIG. 10). The latter is an AJAX request returning a JSON object from the server, which is converted by client's JavaScript into a snippet of HTML code and integrated into the rendered web page.

A first goal and problem that we target is how to eliminate the first level of interaction (along with the browser) and conduct web data extraction exclusively using HTTP interactions, corresponding to the second level. Thus, the first wrapper can be represented by a program which automatically extracts data or by a human which manually navigates with the use of the web browser to the data to be extracted. As a second goal and problem, we also want to minimize the number of HTTP interactions by eliminating those of them which do not lead to HTTP responses with desired data.

Terminology

In the following description, "first wrapper", "visual wrapper" and "input wrapper" are used interchangeably and are understood to have the same scope. The first wrapper can be represented by a program which automatically extracts data or by a human or automated system which navigates with the use of the web browser to data to be extracted, but not limited to those. Similarly, "second wrapper" and "output wrapper" are used interchangeably and are understood to have the same scope.

By the term "browser" we mean web browser (e.g., Chrome, Firefox, Safari, Internet Explorer, Edge), browser engine, and rendering engine (e.g., Blink, Gecko, WebKit), that is, software application which can transform HTML documents and other resources of a web page into an interactive visual representation on a user's device.

Embodiments of the disclosure are exemplified in the context of HTTP interactions. In this context the generated output wrappers (second wrappers) are referred to as "HTTP wrappers". It should be understood, however, that the embodiments are applicable to other types of client-server interactions. Thus, where "HTTP wrappers" are mentioned it should be understood that when the corresponding embodiment is implemented in the context of other types of client-server interaction, the term "HTTP wrapper" should be understood to correspond to the more general term "output wrapper" or "second wrapper".

Overview

Methods are provided for automatically generating a wrapper for extracting web data. The methods are typically computer-implemented. Each of the processes described below can thus be performed using a computer system (which may comprise any of the hardware, firmware and/or software elements that are known in the art for implementing computer systems, including CPUs, physical storage devices such as hard drives or SSDs, memory, input/output devices, network interface hardware, etc.). In some embodiments, the computer system may comprise one or more units, each of which is configured to carry out some aspects of the disclosed methods. The computer-implementation renders the method automatic (i.e, the method can be performed without manual user steps or mental acts). A computer readable storage medium may be provided that stores (e.g. tangibly embodies) a computer program for carrying out any of the methods disclosed using a computer system. Wrappers generated using the disclosed methods may be stored on a computer readable storage medium and/or in memory within the computer system, for later use.

In an embodiment, the method uses a first wrapper, hereinafter referred to as an input wrapper, to generate a second wrapper, hereinafter referred to as an output wrapper. In an embodiment, the input wrapper is configured to extract target data from one or more target web pages hosted by one or more target web servers. In an embodiment, the input wrapper extracts the target data using a web browser engine. In an embodiment, the input wrapper is capable of simulating, where necessary, user input to the one or more target web pages (optionally using the web browser engine and/or otherwise performing web page rendering). The input wrapper may thus be an interactive wrapper.

In an embodiment, the method converts or transforms the input wrapper into the output wrapper.

In an embodiment, the output wrapper is capable of extracting the same target data as the input wrapper from the same one or more target web pages without use of a web browser engine for at least sending of requests to the one or more target web servers and/or for analysing and/or processing replies from the one or more target web servers. In an embodiment, the output wrapper is capable of extracting the same target data as the input wrapper from the same one or more target web pages without any use of a web browser engine. As discussed above, the absence of the need to use the web browser engine means that in many cases the output wrapper can obtain the target data much more efficiently than the input wrapper.

In an embodiment, the generation of the output wrapper comprises analysing one or both of the following: (i) code defining the first wrapper, (ii) interactions between the first wrapper and the one or more target web servers that occur during execution of the first wrapper.

Figure 1:
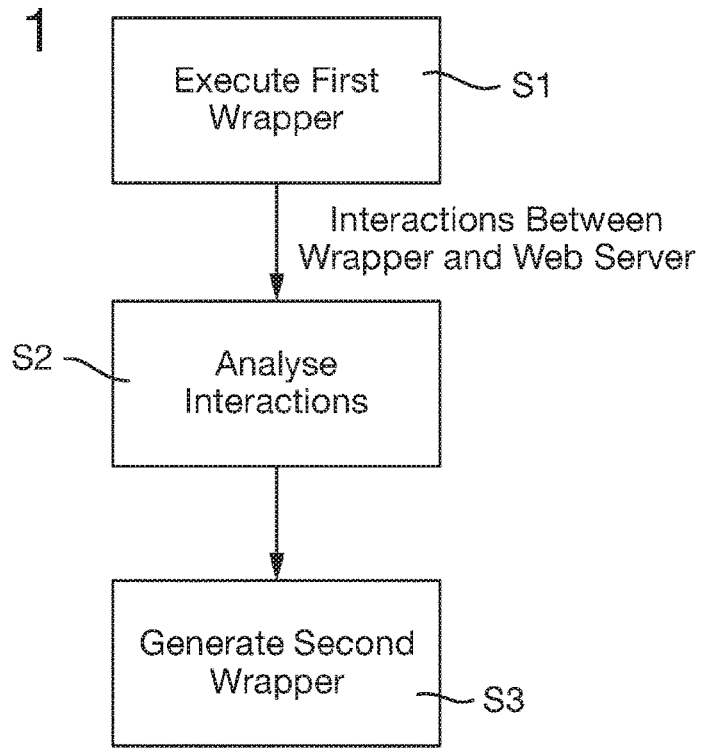
FIG. 1 depicts outline steps in an example method of generating a wrapper for extracting web data.

In an embodiment the method comprises the sequence of steps depicted in FIG. 1, optionally within a general architecture such as that depicted in FIG. 2.

In step S1, the input wrapper (first wrapper) 2 is executed at a client (e.g. a local computer system) to extract target data from one or more target web pages 4 hosted by one or more target web servers 6. As discussed above, the input wrapper 2 may extract the target data by performing web page rendering using a web browser engine to simulate user input that specifies the target data to be extracted.

In step S2, interactions between the input wrapper 2 and the one or more web servers 6 that occurred during execution of the input wrapper 2 are analysed (e.g. using a computer system). As will be described in further detail below, the analysis in step S2 may comprise construction and use of a dependency graph.

In step S3, the analysis performed in S2 is used to generate an output wrapper 8. The output wrapper 8 is generated in such a way that, when executed, the output wrapper extracts the same target data from the web servers 6 as the input wrapper 2. However, in an embodiment the output wrapper 8 extracts the target data by issuing requests directly to the web servers 6 without using a web browser engine and without performing web page rendering. The direct issuing of requests may comprise direct interaction with the backend of the websites 4, for example at the HTTP level (in which case the output wrapper may be referred to as an HTTP wrapper).

In an embodiment, the analysis of the interactions uses recorded traces representing sequences of messages exchanged between the input wrapper 2 and the one or more target web servers 6. The exchanged messages represent interactions between the input wrapper 2 and the web servers 6. In an embodiment, the traces comprise a sequence of HTTP request-reply pairs. In an embodiment, the traces are additionally provided with data extracted by the input wrapper 2 and can have parameters provided by the user.

Example architecture for implementing embodiments of the disclosure is depicted in FIG. 2. The architecture comprises two main building blocks: a wrapper transformer 20 and a browserless extractor 12.

The wrapper transformer 20 takes traces generated by the executed input wrapper 2, which may be stored in a storage device 3 (labelled Traces Base), as its input and produces the output wrapper 8. In an embodiment, wrapper transformer 20 performs at least part of the analysis of step S2. In an embodiment, multiple traces are obtained that correspond to multiple executions of the input wrapper 2 with varying input data (i.e. different input data for different executions). In embodiments of this type, similar interactions from the multiple traces can be grouped based on analysis of their parameters. The parameters for each of the groups of similar interactions are identified by the analysis of differences in their values. In an embodiment, the grouping of interactions comprises grouping interactions from the multiple traces that satisfy an equivalence relation and generating from the group a generalized HTTP request for the group. In an embodiment, the equivalence relation requires HTTP requests in the interactions to comprise one or more of the following: the same parametrised URLs, names of parameters and structures of response bodies.

In an embodiment, the analysis in step S2 comprises construction and use of a dependency graph. The dependency graph is an abstract data structure representing interactions with the web servers 6. The dependency graph comprises nodes and arcs. Each node represents an interaction or set of interactions and each arc represents propagation of parameters from one interaction or set of interactions to another interaction or set of interactions. Some of these nodes can also depend on input parameters provided by the user. Special "target" nodes carry the target data to be extracted. In the architecture of FIG. 2, the output wrapper 8 is constructed in the form of the dependency graph. In the architecture depicted, the wrapper transformer 20 contains four main components: a wrapper transformation program 21, a data transformation generator 22, a data extractor generator 23 and a tuple translator 24.

The wrapper transformation program 21 creates the dependency graph from the traces produced by the execution of the input wrapper 2. In particular, 1) it identifies dependencies between interactions, and 2) it analyses replies from the servers 6 to identify the interactions that carry the target data (i.e., data to be extracted). In an embodiment, the dependency graph is constructed by first including the interactions conveying the target data and then iteratively including other interactions which convey the necessary parameters for already included interactions. In an embodiment, the dependency graph only includes the interactions conveying the target data as well as those nodes and arcs necessary for providing parameters for interactions included in the dependency graph. In an embodiment, parameters of requests which can be removed without changing replies to the requests by more than a predetermined (i.e. acceptable) extent, or at all, are identified. In an embodiment, requests originating from the input wrapper 2 that are not necessary for extracting the target data are identified and omitted when generating the output wrapper 8. Such requests may for example return ads, images or other irrelevant data that are displayed on the target web page.

The data transformation generator 22 automatically creates functions that can convert data from servers' replies into data that is propagated according to the arcs (which may sometimes be referred to as "along the arcs") in the dependency graph or into resulting target data. In an embodiment, the data transformation generator 22 identifies data transformations that the input wrapper 2 applies to replies and to parameters of the interactions. In an embodiment, the data transformation generator 22 transforms each reply to a parameter of another interaction or to said target data. In an embodiment, the data transformation generator 22 analyses JavaScript programs that the input wrapper 2 executes. In an embodiment, the data transformation generator identifies data transformations that the one or more target web servers 6 apply to parameters sent to them by the input wrapper 2. In an embodiment, the data transformation generator 22 is configured to attempt to create a transformation and, in case of success, the transformation is used (e.g. for transforming data from replies, JavaScript, etc.). In certain cases it may not be possible to create transformations, e.g. if we have data of different kinds (e.g., converting names into addresses simply does not make sense) or if transformation is too complex.

The data extractor generator 23 automatically creates data-selectors that are used to extract selected data from replies. In an embodiment, the selected data comprises one or more of the following: a portion of the target data, all of the target data, parameters required by one or more of the interactions. In an embodiment, the data-selectors are synthetized via generalization from examples. In an embodiment, each data-selector comprises one or more of the following: (i) regular expressions, (ii) generalized regular expressions, (iii) XPath expressions, (iv) XPath-like expressions that apply to HTML, (v) expressions in some appropriate tree-grammar, tree automata, finite-state automata, procedures, and programs. In an embodiment, the data-selectors are used to propagate data according to ("along") the arcs of the dependency graph.

The tuple translator 24 converts extracted data into a sequence of tuples.

The browserless extractor 12 takes the output wrapper 8 as its input and iteratively executes interactions with all necessary parameters. These parameters are either provided by the user or extracted from the replies of previously executed interactions, and they are propagated along the arcs in the dependency graph of the output wrapper 8. In embodiments, the output wrapper 8 is classified as "generated" if 1) all dependencies are satisfied, which means that we know how to get all parameters necessary for executing all interactions within the dependency graph of the output wrapper 8 (these parameters can be taken either from replies of other interactions, with the use of data-selectors and data transformers, or from the original user input) and 2) if this output wrapper 8 contains interactions that contain the desired target data.

In embodiments, the output wrapper 8 represents the dependency graph and contains 1) all necessary data selectors and data transformers for propagating data from one interaction to another (along the arcs), 2) it contains tuple transformation procedure. The browserless extractor 12 is a program which is configured to execute the output wrapper 8 effectively and efficiently.

In an embodiment, the generation of the output wrapper is performed partly or fully by analysing code defining the input wrapper. In an embodiment of this type the generation of the output wrapper may comprise direct compilation of the input wrapper into the output wrapper. The generation of the output wrapper may thus be performed without analysing interactions between the input wrapper and the one or more target web servers during execution of the input wrapper. An example approach is described below.

Direct Generation of the Second Wrapper from the First Wrapper (without Interaction Analysis)

There are cases in which the input wrapper can be directly transformed into its counterpart—the output wrapper. This is possible if all interactions the input wrapper executes can be identified by analyzing its source code, which makes an analysis of the wrapper-servers interaction unnecessary.

For example, consider the following input wrapper written in the OXPath language:

```
doc('https://www.aclweb.org/anthology/K/K16/')
   //p:<record>
      [./a:<pdf=qualify-url(@href)>]
      [./b:<authors=normalize-space(.)>]
      [./i:<title=string(.)>]
      [./preceding::h1[1]:<section=string(.)>]
```

It navigates to a web page with the URL https://www.aclweb.org/anthology/K/K16/, using an HTTP GET request, renders the target web page and extracts data from the rendered web page using XPath. The output looks as follows:

```
<?xml version="1.1" encoding="UTF-8"?>

...
   <record>
      <pdf>https://www.aclweb.org/anthology/K/K16/K16-2001.pdf</pdf>
      <authors>Nianwen Xue; Hwee Tou Ng; [...]</authors>
      <title>CoNLL 2016 Shared Task on Multilingual Shallow Discourse Parsing</title>
      <section>Proceedings of the CoNLL-16 shared task</section>
   </record>
   ...

```

All the XPath expressions used within this wrapper can be automatically derived. For example, the attribute "record", representing entities in the target data, is extracted by the input wrapper with the XPath expression //p. All attributes of "record" are extracted with XPath expressions relatively to the extracted "record". Therefore, "authors" is extracted relatively to the extracted "record" with)(Path closure ./b, and "section" is extracted with the XPath expression ./preceding::h1[1].

Thus, the resulting output wrapper can be generated automatically and will consist of a single HTTP GET request to https://www.aclweb.org/anthology/K/K16/ with the set of XPath data selectors, derived from the source code of the input wrapper. As the output data is represented as a tree with sibling nodes "record" and their children "pdf", "authors", "title", and "section", they can be transformed by the tuple translator into a set of tuples of the form record (pdf, authors, title, section"). This tuple, in turn, is the output of the output wrapper.

In general, the analysis of the code of the input wrapper includes (among other steps) the following:

i. the identification of the performed HTTP GET request(s) to the target web server(s);
ii. an analysis of the output of the input wrapper;
iii. an analysis of the data selectors used by the input wrapper;
iv. a conversion of these data selectors into selectors that are directly applicable to the source code of a web page without use of a web browser or a web browser engine;
v. the embedding of these selectors into a wrapper (the output wrapper) which fetches the source code of the target web pages and extracts the relevant data using the data selectors.

The above direct wrapper generation method can be used as part of any embodiment of the disclosure, or can be used as a stand-alone wrapper generator that would thus constitute an embodiment by itself.

Further Implementation Details—Section 1

Embodiments of the present disclosure are based at least partly on combining benefits of interactive wrappers with the benefits of output wrappers that do not use a web browser engine. Embodiments allow automatic compilation of an output wrapper (e.g. an HTTP wrapper) that runs directly over the website's backend API, defined in terms of user events to an interactive wrapper (an input wrapper). By removing the browser, and the need to render HTML, CSS, JavaScript, and other parts of the website's frontend, the output wrapper's performance can be dramatically improved. As this conversion from the input wrapper to the output wrapper is automatic, the output wrapper can be created quickly and easily, with minimal risk of error (in comparison to alternative approaches for creating API-level wrappers manually (i.e. not via automated analysis of an input wrapper)).

In an embodiment, this automatic compilation is achieved by analysis of the client server communications triggered by the input wrapper to identify how input data is used and how the desired result data is fetched from the server. This data-flow analysis allows us to limit the generated output wrapper to only requests that are necessary to obtain the target data. Consider, e.g., the case where a website asks for an airport and provides an autocomplete for city names (that also retrieves the corresponding airport code) and then shows all flights for that airport in the upcoming hours. Assume further that the existing input (interactive) wrapper extracts the flight information from the final page and uses city names as input. According to an embodiment of the present disclosure, an output wrapper can be created for this case which may only require a single HTTP request, if the backend provides an API to look up flights by city name. In case the backend requires airport codes to look up flights, it detects the required parameter and traces it to the autocomplete API which maps city names to the needed airport code. Even in this second case, the generated output wrapper is likely an order of magnitude faster as it avoids rendering any of the pages involved.

Figure 3:
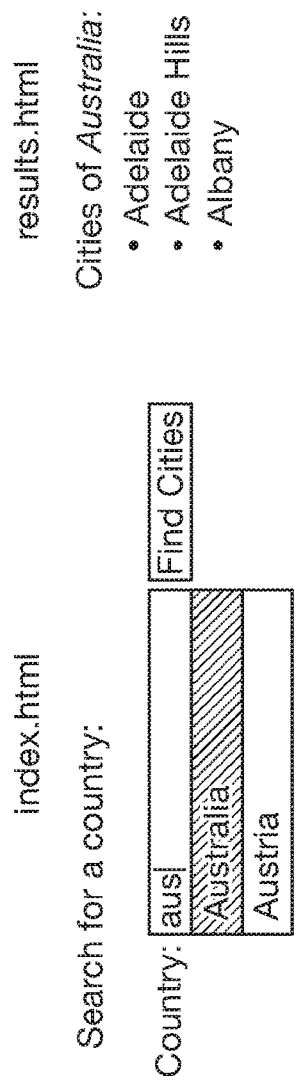
FIG. 3 depicts an abstracted form of an autocomplete facility provided in a search form of a web page.

Consider the example shown in FIG. 3. It represents an abstraction over the many search forms out there with a basic auto-complete facility. A typical interactive wrapper for this site may perform roughly the following steps:

(1) It navigates to the initial page, index.html.
(2) It types in a partial search term, "aus", into the country field. This triggers the page to load the autocomplete suggestions for "aus" from the AJAX endpoint/country-autocomplete. The resulting data is an array of objects with country id (e.g., "AU") and country name (e.g., "Australia").
(3) It then selects the first value from the autocomplete, populating the country field, and the JavaScript country_id variable.
(4) It then clicks the submit button. This submits the form via a GET request to results.html, with parameter country_id.
(5) It waits until the new page is loaded and then extracts the city information. That data is actually also retrieved through an asynchronous request to the/get-cities endpoint and added dynamically to the page. The request returns a single object with a country_id and a list of cities. In OXPath (T. Furche, G. Gottlob, G. Grasso, C. Schallhart, and A. Sellers. OXPath: A language for scalable data extraction, automation, and crawling on the deep web. VLDB J., pages 47-72, 2013), this wrapper would be specified as follows:

```
doc('.../index.html')//input[@id='country']/{"aus" /}
    //ul[@id='ui-id-1']//a[1]/{click /}
    //input[@id='submit-button']/{click /}
    //ul[@id='results']/li:<city=normalize-space(.)>
```

In an embodiment of this disclosure, this input wrapper is transformed into an output wrapper by observing the interactions with the website's backend and identifying only those relevant to retrieve the desired data. As such it performs only the following steps if called with the input parameter "aus" (see FIG. 4).

(1) Call /country-autocomplete with "aus" as input parameter.
(2) Call /get-cities with the country_id from the first returned result.
(3) Return the array of cities from the returned object as result.

Figure 4:
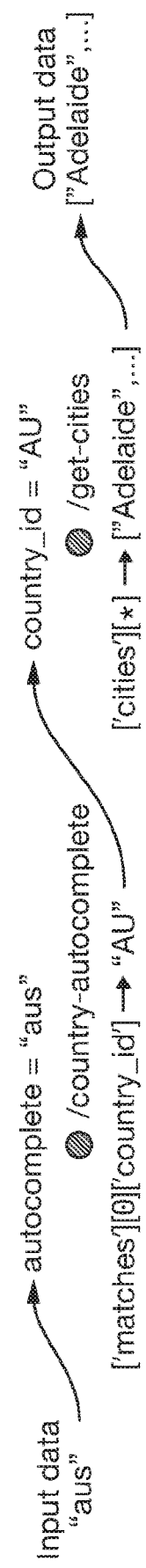
FIG. 4 depicts an example serialized, executable HTTP wrapper.

In embodiments, formats supported for intermediary results include one or more of the following: XML, JSON, JSONP, HTML. For each format, appropriate selectors (referred to herein as data-selectors) can be used to find and extract values (for parameters or the result). In the present example, the resulting second wrapper uses JSONPath (http://goessner.net/articles/JsonPath/) selectors as shown in FIG. 4. The generated second wrapper is 37 times faster than the original input wrapper and performs only 2 instead of 8 HTTP requests.

Further details about input wrappers (e.g. interactive wrappers) and output wrappers (e.g. HTTP wrappers) are discussed below. Evaluation and equivalence of such wrappers is discussed to formalise the problem of how to automatically find (generate) a minimal, equivalent output wrapper (e.g. HTTP wrapper) for a given input wrapper (e.g. interactive wrapper).

Example Implementation Restrictions

In this section we introduce an example list of assumptions ("hard" for compulsory assumptions and "weak" for those which can be omitted with some modifications in the approach) regarding a web application and the wrapper which are applicable to the example described below.

Web Application (1) (hard) Web applications do not change during our experiments.

Execution Flow (2) (weak) Wrappers executes a fixed length action sequence without loops and conditional statements. OXPath, therefore, is used in the comparative evaluation without conditional statements and a Kleene star operand.

(3) (weak) The extraction procedure is performed by the wrapper after the latest interaction with a web page.

Output (4) (weak) The extracted data has a "flat" data structure without optional and multi-value attributes.

(5) (hard) For the same input, a wrapper returns the same output (i.e., extracted data) determined by the wrapper after its execution.

HTTP Request-Response Exchange (6) (weak) In each execution of a wrapper, there is always at least one HTTP response containing all required output data.

(7) (hard) For all sequences of HTTP request-response exchanges generated by the wrapper for the same input values, we assume that there is always a non-empty subsequence that contains all the elements from the intersection of sets of HTTP request-response exchanges observed.

(8) (hard) For all sequences of parametrised URLs of corresponding HTTP request-response exchanges generated by the wrapper for different input values, we assume that there is always a non empty subsequence that contains all the elements from the intersection of sets of parametrised URLs observed.

HTTP Wrapper (9) (hard) Each HTTP wrapper generated for the corresponding interactive wrapper should 1) generate the same sequence of HTTP request-response exchanges for the same wrapper input and 2) the same sequence of parametrised URLs for different wrapper inputs Wrappers Traditional wrappers perform automated interaction with websites. They are used for many purposes, including data extraction, automated testing, web automation, and focused crawling. For the purposes of the present disclosure it is understood that a wrapper comprises any program that interacts with a web site (the "target" site) and extracts data from it.

In the discussion of embodiments below, assumptions on the shape of a wrapper are made that simplify the discussion without affecting the generality of the approach. Embodiments of the disclosure can be straightforwardly applied even when the assumptions are not valid. These assumptions are that (a) wrappers contain no form of branching or looping, (b) whatever data is extracted is extracted from a single page, (c) the extracted data has no optional or multi-valued attributes, (d) the execution of the wrapper is deterministic (same input, same output), at least within a few minutes of execution.

Definition 1. In the present disclosure, an interactive wrapper comprises a wrapper that at least partially relies on the simulation of user interactions (also referred to as user inputs) with the target site, typically using rendered web pages (e.g., with the use of an integrated web browser/web browser engine).

Definition 2. In the present disclosure, an HTTP wrapper comprises a wrapper that leverages exclusively HTTP requests to obtain the required data without simulating user actions or requiring a rendered view of any web page.

Examples of interactive wrappers are:
i) most OXPath expressions (T. Furche, G. Gottlob, G. Grasso, C. Schallhart, and A. Sellers. OXPath: A language for scalable data extraction, automation, and crawling on the deep web. VLDB Journal, 22(1):47-72, 2013),
ii) BODE wrappers (J. Y. Su, D. J. Sun, I. C. Wu, and L. P. Chen. On design of browser-oriented data extraction system and the plug-ins. Journal of Marine Science and Technology, 18(2):189-200, 2010),
iii) Lixto extraction programs (R. Baumgartner, S. Flesca, and G. Gottlob. The E log Web Extraction Language. In R. Nieuwenhuis and A. Voronkov, editors, Logic for Programming, Artificial Intelligence, and Reasoning, volume 2250, pages 548-560. Springer, 2001; R. Baumgartner, G. Gottlob, and M. Herzog. Scalable web data extraction for online market intelligence. Proceedings of the VLDB Endowment, 2(2):1512-1523, 2009.
iv) wrappers created in FMiner (http://www.fminer.com),
v) wrappers created in iMacros (http://imacros.net), and
vi) wrappers created in Mozenda (http://www.mozenda.com).

Interactive Wrapper Execution

The execution of an interactive wrapper triggers a number of HTTP requests to be sent by the wrapper execution engine, e.g., an automated browser, which can be related to corresponding responses. These request-response exchanges can be formalised as HTTP interactions as follows.

Definition 3. An HTTP interaction (or simply an interaction) represents an HTTP request-response pair as a tuple $T=(U^*, V, P, B, R)$, where $U^*$ is a parametrised URL (a URL without its query part and with values of segments, split by "/", removed); V is an HTTP verb; $p=\{\rho_1, \rho_2, \ldots\}$ is a set of request parameters, associated with their origin types such as "header", "cookie", "query", "path", or "post" and having the name and value. B is the body of the response; and R is the set of response parameters, defined similarly to P (with only "cookie" and "header" as allowed origin types). B is represented as a sequence of characters and is associated with one of the following types: "html", "json", "xml", "jsonp", or "javascript".

Parameters of the type "header" correspond to those from the HTTP header and exclude the Cookie and Set-Cookie parameters. "Cookie" refers to the Cookie and Set-Cookie of request and response headers, respectively, and are associated with cookie names. Origin type "query" is related to the parametrised URL. Parameters of type "query" are derived from the query part of the URL (following T. Berners-Lee, R. Fielding, and L. Masinter. Uniform resource identifier (uri): Generic syntax. Standard RFC 3986, The Internet Society (ISOC)/Internet Engineering Task Force (IETF), 2005. Parameters of type "post" are derived from the content body as per Raggett, A. L. Hors, and I. Jacobs. Html 4.01 specification. Recommendation, W3C, 1999) from the POST HTTP request. In the following, we only consider GET and POST as HTTP verbs, for clarity of presentation.

Example 1. In our country search example, the web page reacts on the interaction specified in OXPath as //input[@id='country']/{"aus"/}, invoking an AJAX request to the endpoint /countryautocomplete. The following HTTP interaction can be observed:

$T_1=(\text{http://example.com/<1>}, \text{POST}, \{\rho_1, \rho_2, \ldots\}, B_1, \{\ldots\})$, $\omega(\rho_1)=$path, $\text{ind}(\rho_1)=1$, $\text{val}(\rho_1)=$"country-autocomplete",
$\omega(\rho_2)=$post, $\text{name}(\rho_2)=$"autocomplete", $\text{val}(\rho_2)=$"aus"

In an embodiment, only the POST parameters of the MIME type application/x-www-form-urlencoded (that is used for sending web form fields) are parsed. Other MIME types in the body of a POST request may be excluded for two main reasons: 1) other types are rarely used in modern web applications with a generic scenario involving form filling to get the needed result web page; 2) it can vary considerably and introduce additional computational complexity which greatly reduces the performance of the optimisation procedure; in contrast, the analysis of the body of the HTTP response (that can be of different type) is mainly based on the "input" parameters discovered in other HTTP interactions that reduces the search space to reasonable limits. Hence, if needed, traditional approaches such as Exalg (A. Arasu and H. Garcia-Molina. Extracting structured data from web pages. In Proceedings of the 2003 ACM SIGMOD International Conference on Management of Data, SIGMOD '03, pages 337 348, New York, N.Y., USA, 2003. ACM) can be applied to parse the content and identify potential parameters encoded in the request body.

Wrapper Optimisation

Embodiments of the present disclosure reduce the time and resources needed to execute a wrapper for web data extraction by generating a wrapper (referred to as an output wrapper or HTTP wrapper) that does not need web page rendering. The problem of optimising the generated wrapper, namely the problem of wrapper optimisation as a conversion of the interactive wrapper into a more efficient HTTP wrapper, operating on the HTTP level, is now discussed. This discussion involves defining two main notions: wrapper equivalence and the wrapper optimisation criterion.

Definition 4. (Wrapper Equivalence) Let H, H' be two HTTP wrappers. H≡H' if 1) for every possible $val^I$ (I), that is a wrapper input assignment both for H' and H, H and H' extract the same output; 2) they use the same subset of parametrised URLs, interacting with web servers.

Several parameters can be considered as the criteria of the efficiency of an optimised wrapper (i.e., an HTTP wrapper). Natural candidates are the time required for the wrapper execution, the number of HTTP interactions and amount of data transfer. The time required for wrapper execution is considerably influenced by several factors such as 1) the speed at which the web server respond to HTTP requests, 2) network latency, 3) the speed of the browser in processing DOM events and HTTP request-response pairs, alternating the DOM tree, and rendering the user interface, and 4) the possibility of some web servers to cache queries. We thus know that time is not a robust parameter: if the third factor can be controlled by the use of the same computer with the same software installed, the first and second factors can vary greatly depending on the server and network load, respectively, and the fourth factor also cannot be considered as a reliable aspect. As we assume that the web application does not change during our experiments, we can consider the number of HTTP interactions and data transfer as reliable parameters. As we are particularly interested in the robustness of an optimised version of an interactive wrapper (i.e. our generated output wrapper/HTTP wrapper), we select our primary optimisation criterion to be the minimisation of the number of interactions, i.e., the amount of HTTP interactions of a discovered web server's API. With these notions in place we can finally define the wrapper optimization problem, as considered in this disclosure:

Definition 5. Let $val^I$(I) be a set of wrapper assignments for a given interactive wrapper U, such that for each parameter of the same name there are at least n (in this disclosure, we consider n=3) different values. Then the wrapper optimization problem is the problem of finding an HTTP wrapper H', such that $$\arg\min_{\mathcal{H} \equiv \mathcal{H}^u} \| T^{\mathcal{H}'} \| \to \min.$$

$T^{\mathcal{H}'}$ is a sequence and $|T^{\mathcal{H}'}|$ is a set of HTTP interactions generated by H', $H^U$ is an HTTP wrapper, a counterpart of U, i.e., it generates the same sequence of HTTP interactions as U.

Following this definition, the wrapper optimisation problem is the challenge of finding an HTTP wrapper for a given interactive wrapper (input wrapper), that returns the same results (i.e., the extracts the same target data) and leverages the smallest possible amount of HTTP interactions.

Based on the definitions given for the interactive wrapper (see Def. 1) and a corresponding HTTP wrapper (see Def. 2) to be found according to the objective function (1), as well as assumptions listed in App. A, we introduce the following generic wrapper optimisation approach.

(1) Given a set of sequences T of HTTP interactions observed for executions of the interactive wrapper U for different input assignments $val^I$(I) as specified in Def 5, find equivalence classes of HTTP interactions across different sets of sequences according to their similarity.

(2) Each identified group of HTTP interactions is generalised and represented as an abstract HTTP interaction (see Def. 6) with identified input and output parameters.

(3) Taking into account the parameters discovered, we build a dependency graph (see Def. 7), reflecting the dependency between input and output parameters in different abstract HTTP interactions.

(4) Given a definition of an HTTP wrapper model (see Def. 8), and the objective function (1), we find the most optimal wrappers. Due to the deterministic execution of an HTTP wrapper, the optimisation according to the objective function (1) boils down to the minimisation of the number of abstract HTTP interactions.

Abstract HTTP Interactions

In this section we introduce a notion of abstract HTTP interaction (see Def. 6), that generalises an equivalence class of HTTP interactions observed according to the equivalence relation and reflects its input and potential output parameters, leveraged in building the corresponding dependency graph (see Def. 7).

An equivalence relation~on a set of HTTP interactions is defined between interactions with the same parametrised URLs, names of parameters and structures of response bodies.

Example 2. In our country search example, the interaction shown in Ex. I would be equivalent to the other interactions made to the same endpoint, /country-autocomplete, but with different data. For instance, if:

$T_2$=(http://example.com/<1>,POST,{$\rho_1,\rho_2$, . . . }, $B_2$,{ . . . }), $\omega(\rho_1)$=path, ind($\rho_1$)=1, val($\rho_1$)="country-autocomplete", $\omega(\rho_2)$=post, name($\rho_2$)="autocomplete", val($\rho_2$)="uni", then $T_1 \sim T_2$ as long as the response bodies are similar: $B_1 \sim B_2$, which they are in our example.

All equivalence classes are generalised by a relevant abstract HTTP interaction with input and output parameters identified.

Definition 6. An abstract HTTP interaction T° (or an abstract interaction) models an equivalence class of HTTP interactions and is a tuple T°=T°=(U*, V, P, $\hat{R}$), where U*, V, and P are as in Def. 3. $\hat{R}$={$\hat{r}_1, \hat{r}_2$, . . . } is the original R enriched with additional parameters identified in B of abstracted HTTP interactions. The set of origins of the parameters, therefore, is extended with the value "body". For each parameter in $\hat{R}$ the "path" is specified, which is used to extract the corresponding value of the parameter from the body (that is of one of the types fhtml, xml, json, jsonp, javascriptg).

Given a set of input assignment function $val^I$ for the input parameters I of the abstract HTTP interaction, we can initialize the HTTP request and, after receiving the HTTP response, construct the corresponding HTTP interaction. For the instantiated HTTP interaction val($\hat{r}_i$) can return the value of the output parameter $\hat{r}_i \in \hat{R}$ with origin type,"body", based on its path expression. To extract the value, we use an XPath expression for HTML and XML, JSONPath (our JSONPath notation is similar to http://goessner.net/articles/JsonPath/index.html) for JSON and JSONP, and a regular expression for the JavaScript code. Parameters with other origin are trivially extracted from the corresponding HTTP interaction as it is specified in the section headed "Interactive Wrapper Execution" above.

Dependency Graph

A dependency graph models dependencies between observed and abstracted HTTP interactions based on identified input and output parameters. This graph is the result of the analysis of executions of an interactive wrapper for different input parameters.

Definition 7. A dependency graph is a directed graph $G=(T°, F)$ without loops. $T°$ is a set of abstract HTTP interactions. F is a set of dependency arcs, specifying dependencies between interactions reflecting the propagation of parameters. Thus, $F \subset |T°| \times |T°|$. Each arc is annotated with input-output dependencies between corresponding parameters and the transformation function for converting their values according to the direction of their dependency arc. There are also two types of abstract interactions based on the parameter dependencies: 1) initial abstract HTTP interaction, that is independent from other interactions and all its input parameters are associated with the wrapper input parameters; 2) final abstract HTTP interaction, it conveys all values for all required wrapper output parameters.

The dependency graph for our running example is shown in FIG. 5.

HTTP Wrappers

An HTTP wrapper is an optimization of the interactive wrapper representing a traditional approach to web data extraction. It is built based on the corresponding dependency graph and has the following model.

Definition 8. An HTTP wrapper model of an HTTP wrapper H is a weakly connected acyclic directed graph $G^H=(T°, F)$, a subgraph of a dependency graph G with the following properties: 1) there is at least one initial abstract HTTP interaction and only one final interaction; 2) there is a functional and subjective correspondence between input parameters of abstract HTTP interactions and a set comprising all available output parameters of abstract interactions and wrapper input parameters;

3) there is a functional and subjective correspondence between wrapper output parameters and the set of all output parameters of abstract HTTP interactions. $G^H$ has the order <defined on $T°$, that sets the execution order, reflecting the parameter dependency between abstract interactions.

Example 3. An example of an HTTP wrapper model over the dependency graph for our running example is shown in FIG. 5. Although this is the optimal model for this graph, there is another valid model, including $T°_2$ (results.html) and an edge $(T°_2, T°_1)$.

Given the input assignment function $val^I$ for the input parameters I of the HTTP wrapper H with model $G^H$, the HTTP wrapper execution is the process of instantiating abstract HTTP interactions of the HTTP wrapper model $G^H$ according to the order <.

Algorithm 1 in FIG. 6 demonstrates an example approach to building a dependency graph and generating the output wrapper.

findHttpWrapper generates an HTTP wrapper model $G^H$. For observed interactions findFinalCallGroups finds equivalence classes of HTTP interactions containing the output $Val^O$ and used in building final abstract interactions. trace recursively builds the model $G^H$ based on the current equivalence class. linkWithWrapperOutput sets the correspondence between the final abstract interaction and the wrapper output parameters in $G^H$. abstract identifies input parameters with differing values and ignore those which do not change the response; with this it builds the abstract interaction in $G^H$ with corresponding input parameters. findMatchWithWrapperInput finds a wrapper input parameter i corresponding to the current input parameter r. link WithWrapperInput sets the correspondence between matched parameters in $G^H$. findOutputMatchCall finds equivalence classes containing values of the parameter r in their response. linkCalls integrates the detected match of abstract interactions into $G^H$. All attributes of parameters, such as names, values, paths, and transformation functions, are computed in the algorithm as soon as the value for the attributes can be identified.

This algorithm can also handle repetitive requests to the server, which is ensured by the recursive selection only raw interactions from equivalence classes with the required data in their responses. To set the order <, sequentially according to the recursive invocations of trace. The function trans performs data transformation of parameters' values. According to our observations, usually, the first found match between parameters in the recursive trace is a correct match, which ensures the efficiency of our implementation.

Further Implementation Details—Section 2

In this section, for demonstration purposes, we introduce FastWrap, an implementation of an embodiment of the disclosure that automatically generating HTTP wrappers as a proof of concept. The algorithm of the embodiment takes as input a visual wrapper, referred to as the input wrapper, along with its input parameters, and produces as output a corresponding browserless HTTP wrapper, referred to as the output wrapper. The output wrapper extracts the same data as the input wrapper by directly interacting with the website's servers and does not require loading and rendering the web page.

The implemented FastWrap embodiment works by executing the input wrapper with its input parameters to collect and analyze the sequence of request-response exchanges (referred to as HTTP traces or simply traces) between the input wrapper and the web server. Specifically, these exchanges stem from a rendering engine (as used in, e.g. Lixto), whether or not it is part of a browser (as used in, e.g. Mozenda or OXPath). HTTP traces also include data extracted by the input wrapper (so-called output records). This data is used to identify target HTTP interactions (or target interactions) with the desired output records in their responses. Furthermore, the provided records are used to generate data selectors to extract the data from the content and transform them into a structured representation. If input parameters are necessary (e.g., for web form filling), HTTP traces also include these. They are used to correctly induce the output wrapper which extracts the same data as the input wrapper. Wrapper creation is thus solely based on the direct analysis of these HTTP traces. This makes our approach applicable to a wide range of visual wrappers and avoids tying it to any particular system.

FastWrap Implementation Restrictions

In this section, we describe implementation restrictions which are only relevant to the FastWrap algorithm presented in one of the embodiments. The limitations are introduced to demonstrate its feasibility. Two are on the visual wrappers, and two are on the websites FastWrap applies to.

Single target page. While the considered visual wrapper may visit arbitrarily many pages during execution (and the navigation may be arbitrarily complex), in the embodiment we only consider visual wrappers where the final extracted data is contained in a single Web page, which we call the target page.

Flat records. For simplicity, in the embodiment, we only consider visual wrappers which extract flat data records as output (i.e., no nesting of records, no optional fields, and no compound data values).

Service with reproducible interactions. In the embodiment, we also exclude unstable servers, i.e., web servers that reply to the same request with considerably different content in the response.

Same set of relevant parameter names in similar HTTP interactions. FastWrap does not support those visual wrappers which trigger HTTP requests in which query values are encoded into parameter names.

In the context of this embodiment, a wrapper is called compliant if it satisfies the four wrapper limitations given above.

Overview of the Approach

The overall FastWrap approach can be intuitively explained via the following four main steps.

Step 1: Execute the input wrapper on sample input parameters and collect the corresponding HTTP trace for each run, along with the input parameters and output records. In the special case where input wrapper has no input parameter execute the input wrapper a single time.

In Step 1, the input wrapper is executed several times with different input parameters (e.g., "Preston", "Southampton", and "Walton" for the input parameter city), producing a corresponding number of HTTP traces. A graphical representation of a trace with user input "Preston" is illustrated in FIG. 10. The actual trace seen by our algorithm is a log of HTTP request-response messages (in this case obtained from the OXPath wrapper execution engine), where each response may contain HTML, JSON, XML or other formats.

Step 2: Analyze the traces in order to identify those HTTP interactions that contain the target records. Initially, the target records are the output records, while for subsequent recursive invocations, they are provided by Step 4.7 (see below).

In our example, interaction VI is one of the interactions that carries the required output data. In subsequent invocations, Step 2 will analyze interactions I, II, III, IV, and V. This way the traces are analyzed starting from the output records and leading back towards the input parameters. The advantage of this approach is that only interactions which are causally relevant to the output will be considered, while other, irrelevant interactions (e.g., downloading ads) are disregarded. In our example, all interactions (represented by rectangles in FIG. 10) without numbers are such irrelevant interactions.

Step 3: Group similar HTTP interactions containing the target records from different traces into the same equivalence class. Two interactions are equivalent if they share exactly the same parameter names (possibly with different parameter values).

In our example, recall that FIG. 10 shows only a single trace for one possible input parameter, namely for Preston. Other such traces exist for other input parameters, such as "Southampton", "Walton", etc., where, for instance, instead of interaction I, II, III, we will have interactions I', II', III' (for Southampton) and I", II", III" (for Walton). Step 3 now groups I, I' and I" into the same equivalence class, and does the same for the other interactions.

Note that in our simple example, the grouping looks rather trivial. In more complex cases, the traces for different inputs may of course differ, and the exact notion of equivalence that induces the equivalence classes is important, which we shall discuss later.

Step 4: For each equivalence class c do:

Step 4.1: Generate a data selector able to extract the required records (which were identified in Step 2). That is, generate a single data selector that, for each interaction e of equivalence class c, extracts the required record from the HTTP response of interaction e. If a data selector cannot be generated, skip Steps 4.2-4.8 and return to Step 4.

It is very often the case that extractors for the same parameter can be found in multiple equivalence classes. For example, interaction VI needs the parameters CADC and UPSC. These are in fact obtainable from four different classes of interactions, namely I, III, IV and V. Yet, interactions I and V contain all possible CADC's, and it is not possible for a selector to "magically" guess the right one. Thus, the selector generation fails for (the equivalence class of) interactions I and V, respectively. However, the selector can be easily built from interaction III or IV, for which the selector generation succeeds. Note that for interaction VI, the algorithm generates an XPath-based data selector, as the response is HTML, In other cases, the responses are, for example, JSON-formatted, in which case it would generate JSONPath. Sometimes transformations of the extracted data are required, in which case they are recognized by our algorithm and applied.

Step 4.2: Ensure that all HTTP interactions from the equivalence class are repeatable. That is, re-execute each of the requests, and check whether the selector still selects the same data, Otherwise, skip Steps 4.3-4.8 and return to Step 4.

Step 4.3: For the equivalence class c, classify the parameters into constant and variable parameters. A constant parameter has the same value over all interactions in c; a variable parameter has two or more such values.

In our example, parameters CADC and UPSC (from the body of the HTTP POST requests) are variables, as they occur with different values in different traces (such as GBW3C1, GBW771, GBC678 for CADC). At the same time there are also constant parameters, such as x-brand which is always vauxhall and x-language which is always en (from the URL's query string).

Step 4.4: With query probing techniques, eliminate superfluous variable parameters: those which can be omitted without affecting the data extracted from the HTTP response by the data selectors derived in Step 4.1.

In principle, the algorithm could also remove constant parameters when they are unnecessary. However, removing variable parameters is most important; this reduces the number of dependencies to be satisfied and therefore the algorithm's search space.

Step 4.5: Synthesize an abstract HTTP interaction, that is, an HTTP request which contains placeholders, which are to be instantiated with the values of the variable parameters. These will be the nodes of the dependency graph.

For our example, FIG. 11 shows the abstract HTTP interactions generated from the (concrete) HTTP interactions in FIG. 10. For instance, the equivalence class of HTTP interactions VI corresponds to the abstract HTTP interaction (VI).

Step 4.6: Find variable parameters in c whose values come directly from the input parameters.

For example, the parameter city in interaction can be obtained from the input. Note that in this case the parameter literally occurs in the input (i.e., we have the string "Preston" as a parameter value, and the exact same string "Preston" as the input), but in other cases transformations may be required, as in Step 4.1.

Step 4.7: For each variable parameter v that cannot be obtained from the input, go to Step 2 recursively. Let the target records be all parameter values of v. To avoid recursive loops, remove all interactions from the equivalence class of c from the trace. From the recursive call, we get one dependency graph $D_v$ for each such variable parameter v, or find that no such dependency graph can be obtained for v.

For example, for abstract interaction (VI), the variable parameter CADC cannot be obtained from the input parameters. Therefore, we recursively go to Step 2, using the values of CADC as the target records, i.e., the set {GBW3C1, GBW771, GBC678}.

For this recursive call, all HTTP interactions in the equivalence class of VI are no longer considered. This recursive call returns a "local" dependency graph $D_{CADC}$ (which will ultimately become a subgraph of the overall dependency graph constructed by the algorithm). For the variable parameter UPSC, it yields a dependency graph $D_{UPSC}$. In fact, these two graphs both have the form: (II)←(III), where (II) and (III) are abstract HTTP interactions.

Note that, through this recursion, the final wrapper is not required to keep the HTTP requests in chronological order but may rearrange them to obtain a more efficient wrapper.

Step 4.8: If for some variable parameter v a dependency graph $D_v$ could not be computed, skip this step. Otherwise, create a new dependency graph D by merging all "local" dependency graphs A. Add to D the abstract interaction of c as well as edges from c to each A and c. Return D.

In our example, for abstract interaction (VI), we obtained the graphs (II)←(III) in the previous step, thus the result of merging is exactly the graph (II)←(III). The algorithm adds to it the abstract interaction (VI), as well as two edges, from (VI) to (III), one labeled with the variable CADC, the other with UPSC. This is illustrated in FIG. 11.

This was a simplified explanation of the algorithm. As can be seen in FIG. 11, other parts of the HTTP wrapper are generated apart from those discussed. However, it highlights the central concepts.

Formal Definition of Main Concepts Applicable to FastWrap Embodiment

We now give formal definitions of some of the concepts we have informally introduced in this section, and which are used by the FastWrap algorithm.

Definition 9. An HTTP interaction (or simply an interaction) represents an HTTP request-response exchange as a tuple (U, V, P, B), where U is a parametrized URL (a URL without its query part and with values of segments split by "I", removed); V is an HTTP verb; and P={$\rho_1, \rho_2, \ldots$} is a set of HTTP request parameters, each of which are pairs $\rho_i=(n_i, v_i)$ specifying parameter names and values. A parameter name is a pair (o, s) of an origin and origin-specific name. Origin is one of "header", "path", "query", or "post".

Au HTTP trace is a sequence of HTTP interactions observed during a single execution of an input wrapper. It can either be collected by a proxy server or directly from the input wrapper's interpreter. A trace additionally contains the visual wrapper's input data (e.g. used for form filling) and the extracted output data. If an interaction of an HTTP trace contains all the extracted output data in its response, it is called a target interaction.

Definition 10. An abstract HTTP interaction is an equivalence class of HTTP interactions. Two interactions are equivalent if they have the same signatures and the same response content type. The signature of an HTTP interaction is the set of parameter names of the HTTP interactions (i.e., ignoring the parameters' values). The response content type is the MIME-type of the response (e.g., text/html or application/json).

A parameter name (or simply, a parameter) in an abstract HTTP interaction is either constant or variable. Let V be the set of all values for a parameter in the original HTTP interactions. If this set V contains a single element, the parameter is called constant, otherwise, it is called variable.

Conceptually, an abstract HTTP interaction represents an equivalence class as defined above. In the implementation, it is an HTTP interaction template (U, V, P, B) with empty response body B and where values for variable parameters are removed from P.

Definition 11. A dependency graph is a DAG whose nodes are abstract HTTP interactions, where each edge is annotated by the tuple (n, s, f) where n is a parameter name, s is a data selector and t is a value transformer. A data selector is an expression (e.g., XPath, JSONPath, or regular expression) for extracting data from the HTTP response content. A value transformer is a function which converts the data extracted from the response of one interaction into the format required by the dependent interaction. Nodes may be labeled as target interactions. In addition, the graph contains special nodes input and output, each annotated with parameter names.

FIG. 11 shows a dependency graph for a Vauxhall example. It contains all abstract interactions from all available sets of traces, along with their dependencies. Some matches from FIG. 10 do not give rise to corresponding abstract dependencies; in particular, there are no edges between VI and V, or VI and I. This is due to the fact that V and I contain all possible values for certain parameters, and it is impossible to generate a data selector which can precisely extract only the relevant data corresponding to the given user input.

Definition 12. An HTTP wrapper is a dependency graph with the following properties:

It always contains a single node labeled as the target interaction.

All parameter dependencies are resolved. That is, for each abstract interaction in the graph, if it contains a parameter named a, there is an outgoing edge labeled with a.

The HTTP wrapper can be executed straightforwardly by a depth-first traversal rooted at the single target interaction which provides the output data. Each interaction is initiated after obtaining values for all its variable parameters either from the user input or from other HTTP interactions.

The FastWrap Algorithm

Starting by identifying the final interactions, FastWrap recursively constructs abstract HTTP interactions and sets their corresponding dependency arcs. This exploration of each potential dependency corresponds to a search through the implicit dependency graph for a suitable wrapper. Once a valid wrapper is found, the search terminates. Assuming one exists, one wrapper is generated for each target node. The user or external system can then select one of those according to its own objective function, based on criteria such as precision, recall, number of interactions, or runtime.

Algorithm 1 (see FIG. 12) shows the core algorithm at the heart of FastWrap, starting at Step 2, after having generated the traces. Given the set of recorded HTTP traces T, the algorithm is invoked by calling FindWrappers(T, output(T), true), where output(T) represents the output data for each trace.

The FastWrap algorithm consists of two functions: Find Wrappers and ResolveDependencies. The former finds a) the final abstract interactions containing all required data (see line 3), executing ResolveDependencies in mode 1 (init=true), and b) the intermediate abstract interactions (with their dependency subgraphs), each of which provides the value for a specific variable parameter (see line 5-9), executing ResolveDependencies in mode 2 (init=false).

Given a set of parameters (in mode 2, the set consists of a single parameter), ResolveDependencies, in turn, recursively builds an HTTP wrapper, identifying corresponding interactions with desired data in their responses and adding the appropriate dependency edges.

Implementation Details

FastWrap is implemented in Python. For data and parameter value extraction, FastWrap implements two types of data selectors: XPath and JSONPath. It currently supports a subset of XPath 1.0 for extracting from HTML and XML content. This subset includes node tests, position predicates, attribute, child and descendant axes. JSONPath is an analogous query language for JSON data1, which is used to select data from JSON and JSONP documents. All data selectors can also select sub-structures (i.e., subtrees in the case of XPath, and nested objects in the case of JSONPath) and substrings (either by position or by splitting on a specific symbol).

FastWrap supports six basic types of value transformations, which were introduced based on the analysis of various real-world sites, independent from the dataset evaluated in this experiment.

Removal of double, leading, and trailing spaces.
Extracting substrings and concatenation with constant strings.
Space conversions such as space-to-plus/minus symbols.
URL en-(de-)coding with newer and older standards.
Replacing HTML escape symbols.
Changing the precision of real numbers.
We also support two specific composite transformations:
Space-to-plus followed by URL encoding.
URL encoding, followed by string concatenation.

Evaluation

In this section, an extensive evaluation of the FastWrap approach on different types of websites is conducted. For the experiments we implemented the FastWrap system in Python. It executes visual wrappers and analyses HTTP traces to build corresponding HTTP wrappers. We selected OXPath, a state-of-the-art web data extraction system, as a visual wrapper system for our experiments.

Test Cases. In total, 130 wrappers are considered, out of which 101 (78%) were compliant (according to the definition from Sec. 2). 45% of the 29 rejected wrappers had unreproducible interactions carrying relevant data, and the other 55% invoked the Google Maps API to obtain necessary data (in particular, to obtain geographic coordinates for the location provided as user input). The compliant wrappers (78% of the original 130) span a variety of application domains and feature various degrees of difficulty. In particular, we consider (A) more complex examples involving web form interaction and (B) simpler cases without web form interaction.

Type A Test Cases. Type (A) is used to test the success rate of the FastWrap approach in converting wrappers interacting with web forms with different input parameters (which is necessary for Deep Web data extraction) into their HTTP wrapper counterparts. For this class of test cases, we tested (i) 12 OXPath wrappers for US restaurant chains from the DIADEM dataset; (ii) 11 OXPath wrappers for well-known car dealership websites; (iii) 12 OXPath wrappers for popular websites, mostly from the retail domain, with two or three simulated user interactions (e.g., click and type), each of which triggers HTTP requests (often via AJAX calls) to deliver the content necessary for subsequent interactions (we call this category A-multisteppers); (iv) 25 OXPath wrappers for randomly chosen web pages with web forms (referred to as A-RND). The random sites were chosen by randomly sampling URLs from the Common Crawl search index dataset, which includes around 3 billion web pages. As there were no existing wrappers for classes (ii), (iii) and (iv), new OXPath wrappers were manually written. Wrappers from category (A) are typical search-based wrappers, which fill web forms and extract data from the first result page (which may involve AJAX requests to load additional data). Interestingly, test set (iv), i.e., random URLs turned out to be much simpler and easier to deal with than categories (i)-(iii), which showed rather homogeneous behavior. We thus group (i), (ii) and (iii) into the single class A-RCM (restaurants, cars, and multisteppers). Hence class (A) consists of two subclasses: A-RCM and A-RND.

Type B Test Cases. Type (B) comprises 41 additional OXPath wrappers for US restaurant chains from the DIADEM dataset. In contrast to the restaurant wrappers from set (i), these wrappers do not require filling web forms and do not take input parameters from a user. Thus, for this class of test cases it is enough to analyze a single HTTP trace to identify any target HTTP interactions. This approach is applicable to any wrapper which uses a single, linear navigation and does not depend on input data, even if that navigation requires multiple steps or page downloads.

Experimental Setup. Each experiment consists of two phases: (1) execution of the visual wrapper and (2) generation of the HTTP wrapper.

For phase 1, OXPath was executed with images disabled. It was extended with a proxy server module to listen to HTTP request-response exchanges and record them as HTTP traces, including input parameters and extracted data. Each wrapper of type (A) (i.e., A-RCM and A-RND) was executed eight times with different input parameters selected manually. Wrappers of type (B) do not require input and were executed once each.

In phase 2, the stored HTTP traces from phase 1 were used to induce an HTTP wrapper and test it. Wrappers of type (A) used five of the eight traces for induction (i.e., building an HTTP wrapper). The three remaining traces are used to evaluate the correctness and performance of the generated HTTP wrapper. Wrappers of type (B) were induced and evaluated on a single trace from phase 1.

Results. Overall, our experimental evaluation showed a high success rate of 792%. However, it demonstrated quite different performance on the test sets. In particular, HTTP wrappers were successfully generated for 48.6% of A-RCM wrappers, 96.0% for A-RND, and 95.1% for B-type (lower part of FIG. 13, the rest of the figure will be discussed later). The average time required by FastWrap to generate a wrapper is 44.9 seconds. For the B-type wrappers, which is the simpler category, the average is 2.1 seconds. Due to the larger number of interactions, and in particular more complex data structures in the HTTP responses (and thus in the traces), together with a somewhat larger data volume, the average generation time is 137.9 seconds for A-RCM. The wrapper generation time is shown in FIG. 15, whose other columns will be discussed further below.

Performance Comparison. As can be seen in FIG. 14, all generated HTTP wrappers considerably outperform the respective OXPath wrappers (input wrappers) on all test sets. The resource usage of the generated wrappers was orders of magnitude lower, which confirms our initial expectation that "cutting off" the browser would lead to a significant benefit. The average runtime of the HTTP wrappers is only 4.2% of the runtime of their visual wrapper counterparts. The generated HTTP wrappers use only 3.2% of the data traffic, and perform just 1.4% of the HTTP interactions. Interestingly, while the number of HTTP interactions in the test cases A-RND and B-type is always 1 (which is 1.3% resp. 2.6% of the original number of interactions), for test cases A-RCM it is 1.5 (1.7%) on average. This mainly stems from the subclass A-multisteppers, and in particular eight wrappers, seven of which require two interactions in our HTTP wrapper, and one which requires three (namely our running example, Vauxhall). In these cases, multiple interactions are required due to additional transformations that are not computed on the client side, because they need data from the server or require server-side functionality, such as a database lookup. This is, for example, the case for lexus.fr, where it is necessary to transform input postcodes to geographic coordinates. For our running example Vauxhall, the wrapper needs to transform location names to the variables CADC and UPSC (as mentioned before) representing car dealerships.

Detailed analysis of relevant wrapper features. FIG. 15 represent main features of the generated HTTP wrappers. A specific evaluation test is classified as successful if both precision and recall are 100%, i.e., the data extracted by the HTTP wrapper is identical to the data extracted by the input wrapper. We say that a wrapper is stably correct, if it successfully passes all tests of phase 2. As we see, all wrappers in class A-RCM and B-type are stably correct. For A-RND, we see that 90.9% are stably correct and in total 97% of individual tests are passed. The reason for this is related to deviations in HTML structures, which require either richer test sets or more powerful data selectors. According to our evaluation, 13.8% of variable parameters of HTTP interactions can be omitted without affecting the quality of data extraction. Many web applications actively use such parameters (16.7% for A-RCM), which indicates the importance of query probing for identifying an irrelevant set of parameters to reduce the dependency graph and increase the chance of resolving all dependencies. It is also worth noting that A-RCM's web applications use JSON (52% of content processed by the HTTP wrappers) to deliver relevant data considerably more often than web applications from other categories which, in turn, more often use HTML snippets (91% for A-RND and 92% for B-type). In FIG. 15, we omit value trans-formations applied to the output data as they are always related to removing redundant spaces. For input and intermediate parameters for HTTP interactions, frequently no transformation (68%), or only URL encoding-decoding (21%) are required for transforming values between requests.

Aspects of embodiments disclosed above can be combined in other combinations to form additional embodiments.

Aspects of the disclosure are defined in the following numbered clauses.

1. A method and a system for automatically transforming a computer program, called input wrapper, that extracts data, called target data, from one or more websites, called target websites, into a computer program, called output wrapper, that extracts the same target data from the same target websites, said output wrapper making no use of a web browser engine, and said automatic transformation being based on the automated analysis of one or both of the following: (i) the code of said input wrapper, (ii) interactions between the input wrapper and the one or more web servers that occurred during execution of said input wrapper.
2. The method of Clause 1 comprising:
    executing a first wrapper at a client to extract target data from one or more target web pages hosted by one or more target web servers, the first wrapper extracting the target data by simulating, where necessary, user input to the one or more target web pages, the simulated user input specifying the target data to be extracted;
    analysing interactions between the first wrapper and the one or more web servers that occurred during execution of the first wrapper; and
    using the analysis of the interactions to generate a second wrapper that does not use a web browser engine and is capable of extracting the same target data as the first wrapper by issuing requests directly to the one or more target web servers.
3. The method and system of Clause 1, where said automatic transformation involves an analysis of the interactions and of the data traffic arising during the execution of said input wrapper, comprising requests originating from said input wrapper, and replies issued by one or more servers, called target servers, hosting said target websites.
4. The method and system of Clause 3 where said analysis uses recorded traces of the data extraction process performed by said input wrapper while extracting data from said target websites, where said traces contain sequences of messages exchanged between said input wrapper and said target servers.
5. The method and system of Clause 3, where said analysis comprises the construction and use of a data structure called dependency graph that abstractly represents said interactions.
6. The method and system of Clause 5, where each node of said dependency graph represents a set of interactions.
7. The methods and system of Clause 5, where each arc between two nodes, called source and target nodes, represents the fact that parameters of said target node can be found in said reply of said source node.
8. The method and system of Clause 3 where said analysis is able to identify specific interactions originating from said input wrapper that are irrelevant and can be omitted because their answers do not effectively contribute to the extraction of the target data. (Note: These interactions may, for example, return ads, images and other irrelevant data that are displayed on the target website.)
9. The method and system of Clause 5 where said analysis is able to identify the data transformations that said input wrapper applies to replies and parameters of said interactions.
10. The method and system of Clause 9 where said data transformation transforms said received replies to parameters of another said interaction or said target data.
11. The method and system of Clause 9 where said analysis involves the analysis of JavaScript programs that said input wrapper needs to execute.
12. The method and system of Clause 3 where said analysis is able to identify the data transformations that said target servers apply to parameters sent to them by said input wrapper.
13. The method and system of Clause 5, where data-selectors are constructed for some or all of said target data or parameters required by intermediate interactions, where said data selectors are able to extract relevant data elements efficiently from replies sent by said target servers.

14. The method and system of Clause 13 where said data-extractors are synthetized via generalization from examples.
15. The method and system of Clause 13, where said data-extractors are among a plurality of methods and programs comprising: (i) regular expressions, (ii) generalized regular expressions, (iii) XPath expressions, (iv) XPath-like expressions that apply to HTML, (v) expressions in some appropriate tree-grammar, tree automata, finite-state automata, procedures, and programs.
16. The method and system of Clause 13, where said data-extractors are used to propagate data along the arcs of said dependency graph.
17. The method and system of Clause 4, where multiple traces are obtained that correspond to multiple executions of said input wrapper with varying input data.
18. The method and system of Clause 17, where similar interactions from said multiple traces are grouped together based on the analysis of their parameters.
19. The method and system of Clause 18, where parameters for each said group of said similar interactions are identified by the analysis of differences in their values.
20. The method and system of Clause 3, where said analysis includes identification of parameters of said requests which can be removed without changing said replies or only changing said replies to an accepted extent.
21. The method and system of Clause 5, where said dependency graph only includes the interactions conveying said target data as well as those nodes and arcs necessary for providing parameters for interactions included in said dependency graph.
22. The method and system of Clause 21, where said dependency graph is constructed by first including the interactions conveying said target data and then iteratively including other interactions which convey the necessary parameters for already included interactions.
23. The method and system of Clause 4, where said recorded traces are sequences of HTTP request-reply pairs between said input wrapper and said target servers.
24. The method and system of Clause 1 where, in cases it is possible, said input wrapper is directly compiled into said output wrapper.
25. The method and system of Clause 19, where the said analysis can identify composite parameters of said group of similar interactions, where composite parameters are parameters consisting of other parameters.

The invention claimed is:
1. A method for automatically transforming a wrapper for extracting web data, comprising:
transforming a first wrapper into a second wrapper, wherein:
the first wrapper is configured to extract target data from one or more target web pages hosted by one or more target web servers;
the second wrapper is configured to extract the same target data from the same one or more target web pages without using a web browser engine to perform a) sending requests to the one or more target web servers, and/or b) processing replies from the one or more target web servers; and
the transforming comprises analyzing one or both of the following: (i) code defining the first wrapper, (ii) interactions between the first wrapper and the one or more target web servers that occur during execution of the first wrapper.
2. The method of claim 1, wherein the first wrapper is configured to extract the target data using a web browser engine.
3. The method of claim 1, wherein the first wrapper is configured to simulate, where necessary, user input to the one or more target web pages.
4. The method of claim 1, wherein the analysis of t interactions comprises identifying data transformations that the one or more target web servers apply to parameters sent to them by the first wrapper.
5. The method of claim 1, wherein the analysis of interactions comprises construction and use of a dependency graph comprising nodes and arcs, each node representing an interaction or set of interactions and each arc representing propagation of parameters from one interaction or set of interactions to another interaction or set of interactions.
6. The method of claim 5, wherein the dependency graph is constructed by first including the interactions conveying the target data and then iteratively including other interactions which convey parameters necessary for already included interactions.
7. The method of claim 5, wherein the dependency graph consists exclusively of nodes corresponding to interactions conveying the target data and nodes and arcs necessary for providing parameters for the interactions conveying the target data.
8. The method of claim 5, further comprising constructing one or snore data-selectors configured to extract selected data from replies sent by the one or more target servers, wherein the selected data comprises one or more of the following: a portion of the target data, all of the target data, and one or more parameters required by one or more of the interactions.
9. The method of claim 8, wherein the data-selectors are synthetized via generalization from examples.
10. The method of claim 8, wherein each data-selector comprises one or more of the following: (i) regular expressions, (ii) generalized regular expressions, (iii) XPath expressions, (iv) XPath-like expressions that apply to HTML, (v) expressions in some appropriate tree-grammar, tree automata, finite-state automata, procedures, and programs.
11. The method of claim 8, wherein the data-selectors are used to propagate data according to the arcs of the dependency graph.
12. The method of claim 1, wherein the analysis of the interactions uses recorded traces representing sequences of messages exchanged between the first wrapper and the one or more target web servers.
13. The method of claim 12, wherein multiple traces are obtained that correspond to multiple executions of the first wrapper, each execution being performed with different input data to the first wrapper.
14. The method of claim 13, further comprising grouping interactions from the multiple traces that satisfy an equivalence relation and generating from the group a generalized HTTP request for the group.
15. The method of claim 14, wherein the equivalence relation requires HTTP requests in the interactions to comprise one or more of the following: the same parametrized URLs, names of parameters and structures of response bodies.

16. The method of claim 13, wherein similar interactions from the multiple traces are grouped together based on analysis of parameters of the interactions.

17. The method of claim 16, wherein parameters for each group of similar interactions are identified by analysis of differences in values of the parameters.

18. The method of claim 17, wherein the analysis of differences in values of the parameters can identify composite parameters of each group of similar interactions, where composite parameters are parameters consisting of other parameters.

19. The method of claim 12, wherein the recorded traces comprise sequences of HTTP request-reply pairs between the first wrapper and the one or more target web servers.

20. The method of claim 1, wherein the analysis of the interactions includes identification of parameters of requests which can be removed without changing replies to the requests by more than a predetermined extent.

21. The method of claim 1, wherein the analysis of the interactions comprises identifying requests originating from the first wrapper that are not necessary for extracting the target data and omitting those requests during transformation of the first wrapper into the second wrapper.

22. The method of claim 1, wherein the analysis of the interactions comprises identifying data transformations that the first wrapper applies to replies and to parameters of the interactions.

23. The method of claim 22, wherein the data transformation comprises transforming each reply to a parameter of another interaction or to the target data.

24. The method of claim 22, wherein the analysis of the interactions comprises analysis of JavaScript programs that the first wrapper executes.

25. The method of claim 1, comprising:
executing the first wrapper at a client to extract the target data from the one or more target web pages, the first wrapper extracting the target data by simulating, where necessary, user input to the one or more target web pages, the simulated user input specifying the target data to be extracted;
analyzing interactions between the first wrapper and the one or more target web servers that occurred during execution of the first wrapper; and
using the analysis of the interactions to transform the first wrapper into the second wrapper.

26. The method of claim 25, wherein the simulation of user input by the first wrapper comprises rendering a web page using a web browser engine.

27. The method of claim 26, wherein the user input comprises one or more interactions that a user can make with a displayed web page.

28. The method of claim 1, wherein the transforming comprises direct compilation of the first wrapper into the second wrapper.

29. A non transitory computer readable storage medium having recorded thereon program code that, when executed on a computer system, instructs the computer system to carry out the method of claim 1.

30. A computer system configured to automatically transform a wrapper for extracting web data, the computer system being configured to perform the following steps:
transforming a first wrapper into a second wrapper, wherein:
the first wrapper is configured to extract target data from one or more target web pages hosted by one or more target web servers;
the second wrapper is configured to extract the same target data from the same one or more target web pages without using a web browser engine to perform a) sending requests to the one or more target web servers, and/or b) processing replies from the one or more target web servers; and
the transforming comprises analyzing one or both of the following: (i) code defining the first wrapper, (ii) interactions between the first wrapper and the one or more target web servers that occur during execution of the first wrapper.

31. A method for automatically generating a wrapper for extracting web data, comprising:
executing a first wrapper to extract target data from one or more target web pages hosted by one or more target web servers;
analyzing one or both of the following: (i) code defining the first wrapper, and (ii) interactions between the first wrapper and the one or more target web servers that occur during the execution of the first wrapper; and
using the analysis to generate an output wrapper that, when executed, extracts the same target data from the same one or more target web pages without using a web browser engine to perform a) sending requests to the one or more target web servers, and/or b) processing replies from the one or more target web servers.

* * * * *